US009767298B2

(12) United States Patent
Hayashi et al.

(10) Patent No.: US 9,767,298 B2
(45) Date of Patent: Sep. 19, 2017

(54) INFORMATION STORAGE DEVICE, INFORMATION PROCESSING SYSTEM, INFORMATION PROCESSING METHOD, AND PROGRAM

(71) Applicant: SONY CORPORATION, Minato-ku (JP)

(72) Inventors: Takamichi Hayashi, Tokyo (JP); Hiroshi Kuno, Kanagawa (JP); Koji Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 14/363,135

(22) PCT Filed: Nov. 29, 2012

(86) PCT No.: PCT/JP2012/080869
§ 371 (c)(1),
(2) Date: Jun. 5, 2014

(87) PCT Pub. No.: WO2013/105354
PCT Pub. Date: Jul. 18, 2013

(65) Prior Publication Data
US 2014/0351585 A1 Nov. 27, 2014

(30) Foreign Application Priority Data
Jan. 12, 2012 (JP) ................................. 2012-004418

(51) Int. Cl.
*G06F 21/62* (2013.01)
*H04N 5/913* (2006.01)
(Continued)

(52) U.S. Cl.
CPC .............. *G06F 21/62* (2013.01); *G06F 21/10* (2013.01); *G06F 21/105* (2013.01); *H04L 9/088* (2013.01);
(Continued)

(58) Field of Classification Search
None
See application file for complete search history.

(56) References Cited

U.S. PATENT DOCUMENTS 6,950,522 B1 * 9/2005 Mitchell ................. H04L 9/083
370/389
7,587,749 B2 * 9/2009 Leser ....................... H04L 9/08
705/57

(Continued)

FOREIGN PATENT DOCUMENTS

JP 2008-98765 A 4/2008
JP 2010-28485 A 2/2010

(Continued)

OTHER PUBLICATIONS

International Search Report issued Jan. 8, 2013 in PCT/JP2012/080869.

*Primary Examiner* — Benjamin Lanier
(74) *Attorney, Agent, or Firm* — Chip Law Group

(57) ABSTRACT

There is provided a device and a method for preventing using of illegitimate content or manufacturing of the illegitimate media that uses illegitimate media. In a system that has an information storage device, a license management apparatus that generates a media key set (MKS) that is stored in the information storage device, and a content provision apparatus, at the time of manufacturing of the information storage device, the license management apparatus compares an MKS version that is set in the MKS that is stored in the information storage device, and an allowance minimum MKS version that is recorded in a controller of the information storage device, and thus records key information stored in the MKS, in a storage unit under the condition that it is confirmed that the MKS version is equal to or greater in value than the allowance minimum MKS version.

13 Claims, 20 Drawing Sheets

(51) Int. Cl.
  *H04N 21/4405* (2011.01)
  *H04N 21/4627* (2011.01)
  *H04N 21/8355* (2011.01)
  *H04N 5/903* (2006.01)
  *H04L 9/32* (2006.01)
  *H04L 9/08* (2006.01)
  *H04L 29/06* (2006.01)
  *G06F 21/10* (2013.01)

(52) U.S. Cl.
  CPC .......... *H04L 9/3268* (2013.01); *H04L 9/3273* (2013.01); *H04L 63/06* (2013.01); *H04L 63/062* (2013.01); *H04L 63/0869* (2013.01); *H04L 63/10* (2013.01); *H04L 63/12* (2013.01); *H04N 5/903* (2013.01); *H04N 5/913* (2013.01); *H04N 21/4405* (2013.01); *H04N 21/4627* (2013.01); *H04N 21/8355* (2013.01); *G06F 2221/07* (2013.01); *H04N 2005/91364* (2013.01)

(56) References Cited

U.S. PATENT DOCUMENTS

| | | | | |
|---|---|---|---|---|
| 8,943,605 B1* | 1/2015 | Martin | .................. | H04L 9/0872 726/27 |
| 8,972,525 B1* | 3/2015 | Ramachandran | .. | G06Q 30/0251 709/217 |
| 2001/0010723 A1* | 8/2001 | Pinkas | .................. | 380/286 |
| 2002/0002466 A1* | 1/2002 | Kambayashi et al. | ........... | 705/1 |
| 2002/0152401 A1* | 10/2002 | Zhang | .................. | G06F 21/121 726/5 |
| 2002/0159596 A1* | 10/2002 | Durand et al. | ................ | 380/255 |
| 2002/0198844 A1* | 12/2002 | Ohmori et al. | ................. | 705/51 |
| 2003/0044006 A1* | 3/2003 | Riddick et al. | ................ | 380/44 |
| 2003/0046568 A1* | 3/2003 | Riddick et al. | ................ | 713/193 |
| 2005/0086328 A1* | 4/2005 | Landram | .................. | H04L 67/34 709/220 |
| 2006/0066902 A1* | 3/2006 | Matsui et al. | ................ | 358/1.16 |
| 2007/0083757 A1* | 4/2007 | Nakano et al. | ................ | 713/168 |
| 2008/0065584 A1* | 3/2008 | Motoyama | .................. | G06Q 40/025 |
| 2008/0271165 A1* | 10/2008 | Schnell | .................. | G06F 21/10 726/30 |
| 2009/0083323 A1* | 3/2009 | Elliott et al. | ................ | 707/104.1 |
| 2010/0017626 A1 | 1/2010 | Sato et al. | | |
| 2010/0268953 A1 | 10/2010 | Matsukawa et al. | | |
| 2010/0275036 A1* | 10/2010 | Harada | .................. | G06F 21/10 713/189 |
| 2011/0004669 A1* | 1/2011 | Navar | .................. | G06F 21/10 709/217 |
| 2011/0038477 A1* | 2/2011 | Bilodi | .................. | H04L 9/0891 380/44 |
| 2011/0119504 A1* | 5/2011 | Nishimura | .................. | 713/193 |
| 2012/0170751 A1* | 7/2012 | Wurm | .................. | 380/278 |
| 2013/0282521 A1* | 10/2013 | Garg et al. | .................. | 705/26.8 |
| 2013/0318571 A1* | 11/2013 | Radzikowski | .......... | G06F 21/45 726/4 |
| 2014/0283120 A1* | 9/2014 | Mao | .................. | G06F 21/6218 726/28 |

FOREIGN PATENT DOCUMENTS

JP      2010-268417 A      11/2010
WO    WO 2012/011254 A1    1/2012

* cited by examiner

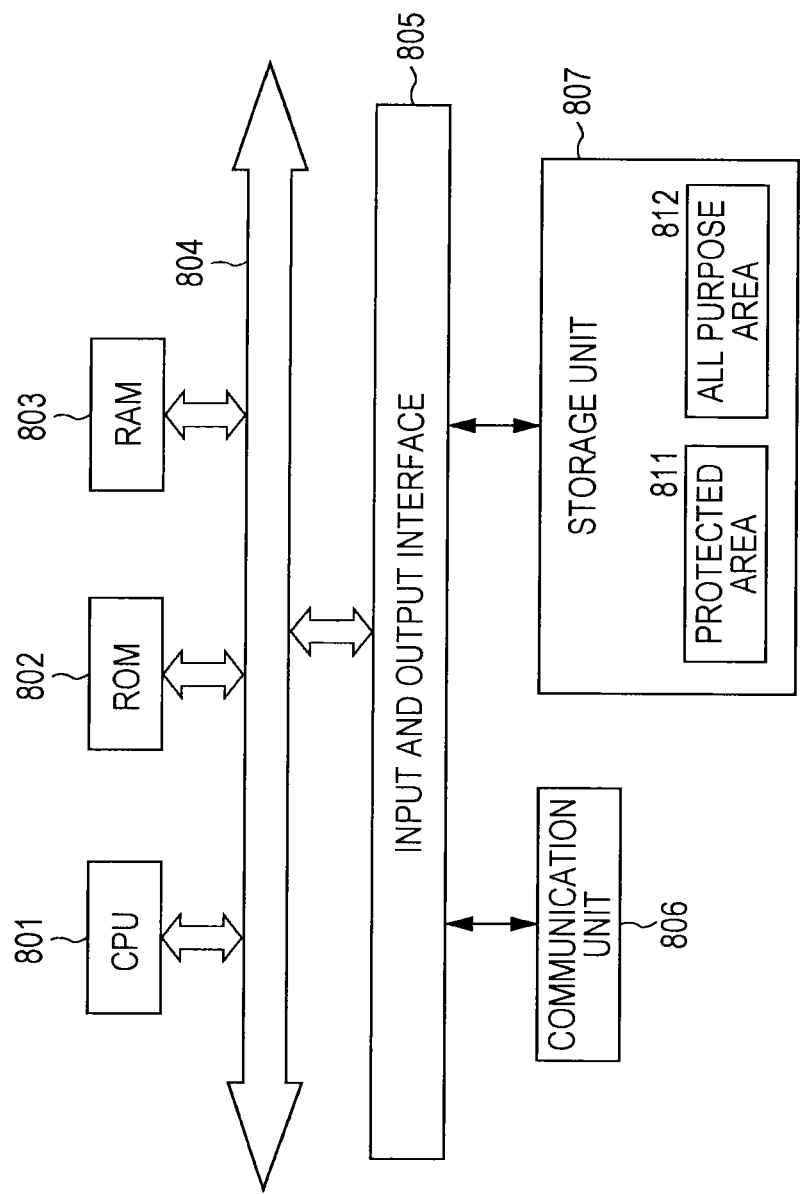

INFORMATION STORAGE DEVICE, INFORMATION PROCESSING SYSTEM, INFORMATION PROCESSING METHOD, AND PROGRAM

TECHNICAL FIELD

The present disclosure relates to an information storage device, an information processing system, and an information processing method, and a program. The present disclosure relates particularly to an information storage device, an information processing system, and an information processing method, and a program all of which prevent illegitimate use of content.

BACKGROUND ART

For example, content, such as a movie or music, is provided to a user, through a digital versatile disc (DVD) or Blue-ray disc (a registered trademark), various media such as a flash memory, a network such as the Internet, a carrier wave, or the like. The user can perform reproducing of content, for example, using a recording and reproducing apparatus, such as a PC, a portable terminal, and a BD player, and various information apparatuses, such as a television.

However, authors or sellers of many pieces of content, such as music data and image data, that are provided to the user, have copyright, distribution rights, and the like. Therefore, if content is provided to the user, in most cases, a provider of the content imposes predetermined use limitation on the content.

For example, it is possible for a digital recording apparatus and a recording medium to repeat recording and reproducing without image or voice deterioration, and there occurs a problem that use of illegitimate copy content is prevalent such as distribution of the illegitimate copy content over the Internet or circulation of so-called pirated discs.

As a specific configuration for preventing such an illegitimate use of content, encryption processing of content is available. With such a configuration, setting is performed in a manner that encrypts the content that is provided to the user and thus enables only an authorized user to obtain a key to the content. Such processing is disclosed, for example, in PTL 1 (Japanese Unexamined Patent Application Publication No. 2008-98765).

The key that is used to decrypt the encrypted data is given to only a reproducing apparatus that receives a license that gives the right to use the content. The license, for example, is given to the reproducing apparatus that is designed in a manner that complies with predetermined operational regulations, such as one that prohibits conducting of illegitimate copying. On the other hand, the reproducing apparatus that does not receive the license does not have the key for decrypting the encrypted data, and because of this, cannot perform the decrypting of the encrypted data.

However, although such content encryption is executed, there is an actual situation in which illegitimate use of content is performed.

One example of the illegitimate use of content is described.

The content is recorded in media (memory card) such as a flash memory.

A media key set (MKS) that is an encryption key set inherent to the memory card is stored, in advance, in the memory card.

The encryption key set (MKS), for example, is configured from a key set including a public key and a private key that are issued by a license management apparatus (license authority (LA)). Moreover, in most cases, the public key is stored in a public key certificate (PKC) and thus is used.

In addition to the public key, the public key certificate (PKC) has an identifier (ID) of a device (host or media) and the like, as recording data, and is a certificate in which a signature of the license management apparatus (LA) is set.

For example, if content stored in a memory card is reproduced, or if new content is recorded in a certain memory card, mutual authentication processing is executed between an apparatus (host) into which the memory card is mounted and the memory card. For example, the mutual authentication processing according to a public key encryption method is executed and the encryption key set (MKS) described above is applied.

In the authentication processing, the host and the media mutually confirm that the other party is not an illegitimate device. As a condition for establishing the authentication, the host is allowed to read the content recorded in the memory card, or an encryption key that is applied to decrypting of the content.

Moreover, the license management apparatus (LA) issues a revocation list of identifiers (ID) of illegitimate devices, and provides the revocation list to the device that executes the mutual authentication described above. Referring to such a revocation list, the device that performs the mutual authentication executes processing that confirms whether or not the ID of the other party's device to be authenticated is registered.

If the ID is registered with the revocation list, it is confirmed that such a device is illegitimate, and the reproducing or recording of the content is prohibited.

The revocation list is issued by the license management apparatus (LA) and is successively updated. Furthermore, an electronic signature of the license management apparatus (LA) that is an issuing body is given and is configured in a manner that prevents falsification.

For example, a user apparatus that performs content reproducing and the like confirms legitimacy of the revocation list, with signature verification of the revocation list, and thereafter confirms whether or not an ID of a reproducing apparatus or a storage device that is used is registered with the revocation list. Thus, only if it is confirmed that the ID is not registered, a subsequent processing, such as reproducing of the content, is allowed.

If a new illegitimate device is found, the license management apparatus (LA) executes update processing of the revocation list that additionally registers the ID of the new illegitimate device. That is, the revocation list that is version-updated is successively distributed.

The updated revocation list is provided to the user apparatus over a network. Alternatively, the updated revocation list is recorded in the media in which the content is recorded and is provided to the user apparatus.

As a general rule, one of the encryption key sets (MKS) described above is set to be in one device. Therefore, the same encryption key set (MKS) is not stored in multiple memory cards.

However, a case where a manufacturer of the memory card creates a copy of one encryption key set (MKS) and stores the same encryption key set (MKS) in multiple memory cards and thus circulates the multiple memory cards can occur.

In most cases, because the encryption key set (MKS) is provided, for a fee, from the license management apparatus (LA), there is likelihood that a situation will occur where in order to decrease the cost, a manufacturer of illegitimate memory cards stores one key set in multiple memory cards and thus circulates lower-priced memory cards in the market.

When the media (memory card) in which the same key set (MKS) is stored is circulated, content use management in media units is not possible.

For example, if an illegitimate media is found, the setting can be provided in such a manner that the ID of such media is added to the revocation list described above, the authentication establishment with the specific media is made impossible, and thus content reproducing or new content recording is not executed thereafter. However, when the same key set is recorded in many of the media, such use control in the media units is prevented. As a result, there occurs a problem that strict use management cannot be realized.

CITATION LIST

Patent Literature

PTL 1: Japanese Unexamined Patent Application Publication No. 2008-98765

SUMMARY OF INVENTION

Technical Problem

In view of, for example, the problem described above, the present disclosure provides an information storage device, an information processing system, and an information processing method, and a program all of which prevent illegitimate use of content.

Solution to Problem

The present disclosure provides an information storage device including: a storage unit in which key information is stored; and a controller that executes processing which records the key information in the storage unit, in which the controller compares a key version that is set to correspond to the key information and an allowance minimum key version which is recorded, in advance, within the controller, and records the key information in the storage unit under the condition that the key version is equal to or greater in value than the allowance minimum key version.

In the information storage device, the key information may be key information that is generated by a license management apparatus, the key version may be version information that is set depending on the date and time of generation of the key information by the license management apparatus, and the allowance minimum key version may be version information that is stored in the controller depending on the date and time of manufacture of the controller by an apparatus that manufactures the controller.

In the information storage device, the key information may include a media public key and a media private key that are inherent to the information storage device.

In the information storage device, the key information may be a media key set (MKS) that includes a media public key and a media private key that are inherent to the information storage device, which is generated by a license management apparatus and an MKS version that is the key version that is set by the license management apparatus, in which the allowance minimum key version may be an allowance minimum MKS version that is set by a controller manufacturing apparatus, and in which the controller may execute processing that compares the MKS version that is recorded in the media key set (MKS) by inputting the media key set (MKS), and the allowance minimum MKS version, and may record the media public key and the media private key in the storage unit under the condition that it is confirmed that the MKS version is equal to or greater in value than the allowance minimum MKS version.

In the information storage device, the media key set (MKS) may be data that is generated by the license management apparatus and that the license management apparatus sets a digital signature to be in, in which the controller may perform signature verification processing on the digital signature, may execute verification of the presence of absence of falsification of the media key set (MKS), may confirm with establishment of signature verification that there is no falsification of the media key set (MKS), and then may execute the processing that compares the MKS version and the allowance minimum MKS version.

In the information storage device, after processing that records the key information in the storage unit, the controller may execute processing that generates and thus may output a key binding log that includes an identifier of the key information and an identifier of the controller.

In the information storage device, the controller may generate the key binding log in which a falsification verification value is assigned to data including the identifier of the key information and the identifier of the controller.

The present disclosure provides an information processing system including: an information storage device (media) that has a storage unit and a controller; a license management apparatus that generates a media key set (MKS) which is an inherent key set that is stored in the information storage device; a controller manufacturing apparatus that manufactures the controller that is stored in the information storage device; and a media manufacturing apparatus that manufactures the information storage device, in which the license management apparatus sets an MKS version that depends on the date and time of the generation of the media key set (MKS), to be in the media key set (MKS), and provides the media key set (MKS) to the media manufacturing apparatus, in which the controller manufacturing apparatus stores an allowance minimum MKS version that depends on the date and time of the manufacture of the controller, in the controller and provides the controller to the media manufacturing apparatus; and in which at the time of manufacturing of the information device (media), the media manufacturing apparatus inserts the controller into the media, and executes processing that inputs the media key set (MKS) into the controller inside of the media, and under the condition that it is confirmed that the controller inside of the media executes processing that compares the MKS version that is recorded in the media key set (MKS) and the allowance minimum MKS version and the condition that it is confirmed that the MKS version is equal to or greater in value than the allowance minimum MKS version, the media manufacturing apparatus executes processing that records in the storage unit a media public key and a media private key that are included in the media key set (MKS).

In the information processing system, after processing that records the media public key and the media private key in the storage unit, the controller may generate and thus output a key binding log that includes an identifier of the MKS and an identifier of the controller, and the license management apparatus may input the key binding log and thus retains the key binding log as management data.

The present disclosure provides an information processing method that is executed in an information storage device, in which the information storage device includes a storage unit in which key information is stored and a controller that executes processing which records the key information in the storage unit, and in which the controller compares a key version that is set to correspond to the key information and an allowance minimum key version which is recorded, in advance, within the controller, and records the key information in the storage unit under the condition that it is confirmed that the key version is equal to or greater in value than the allowance minimum key version.

The present disclosure provides a program for executing information processing in an information storage device, in which the information storage device includes a storage unit in which key information is stored, and a controller that executes processing which records the key information in the storage unit, and in which the program causes the controller to execute processing that compares a key version that is set to correspond to the key information and an allowance minimum key version which is recorded, in advance, and processing that records the key information in the storage unit under the condition that it is confirmed that the key version is equal to or greater in value than the allowance minimum key version.

Moreover, the program in the present disclosure is a program that is capable of being supplied, for example, to an information processing apparatus or a computer or system, on which various programs or codes are executable, using a storage medium or communication medium that is provided in a computer-readable format. Processing according to such a program on the information processing apparatus or the computer or system is realized by providing the program in a computer-readable format.

Other objects, features, or advantages of the present disclosure are apparent from a more detailed description, based on embodiments in the present disclosure described below or on the accompanying drawings. Moreover, a system in the present specification is configured to be a logical combination of multiple apparatuses, and the apparatuses in each configuration are not limited to being within the same housing.

Advantageous Effects of Invention

With a configuration of one embodiment in the present disclosure, a device and a method are provided that prevent using of illegitimate content or manufacturing of the illegitimate media that uses illegitimate media.

Specifically, in a system that has an information storage device, a license management apparatus that generates a media key set (MKS) that is stored in the information storage device, and a content provision apparatus, at the time of manufacturing of the information storage device, the license management apparatus compares an MKS version that is set in the MKS that is stored in the information storage device, and an allowance minimum MKS version that is recorded in a controller of the information storage device, and thus records key information stored in the MKS, in a storage unit under the condition that it is confirmed that the MKS version is equal to or greater in value than the allowance minimum MKS version.

With such configurations, a configuration is realized that prevents using of illegitimate content or manufacturing of the illegitimate media that uses illegitimate media.

BRIEF DESCRIPTION OF DRAWINGS

FIG. 20 is a diagram for describing a hardware configuration example of the information storage device such as the memory card.

DESCRIPTION OF EMBODIMENTS

Figure 1:
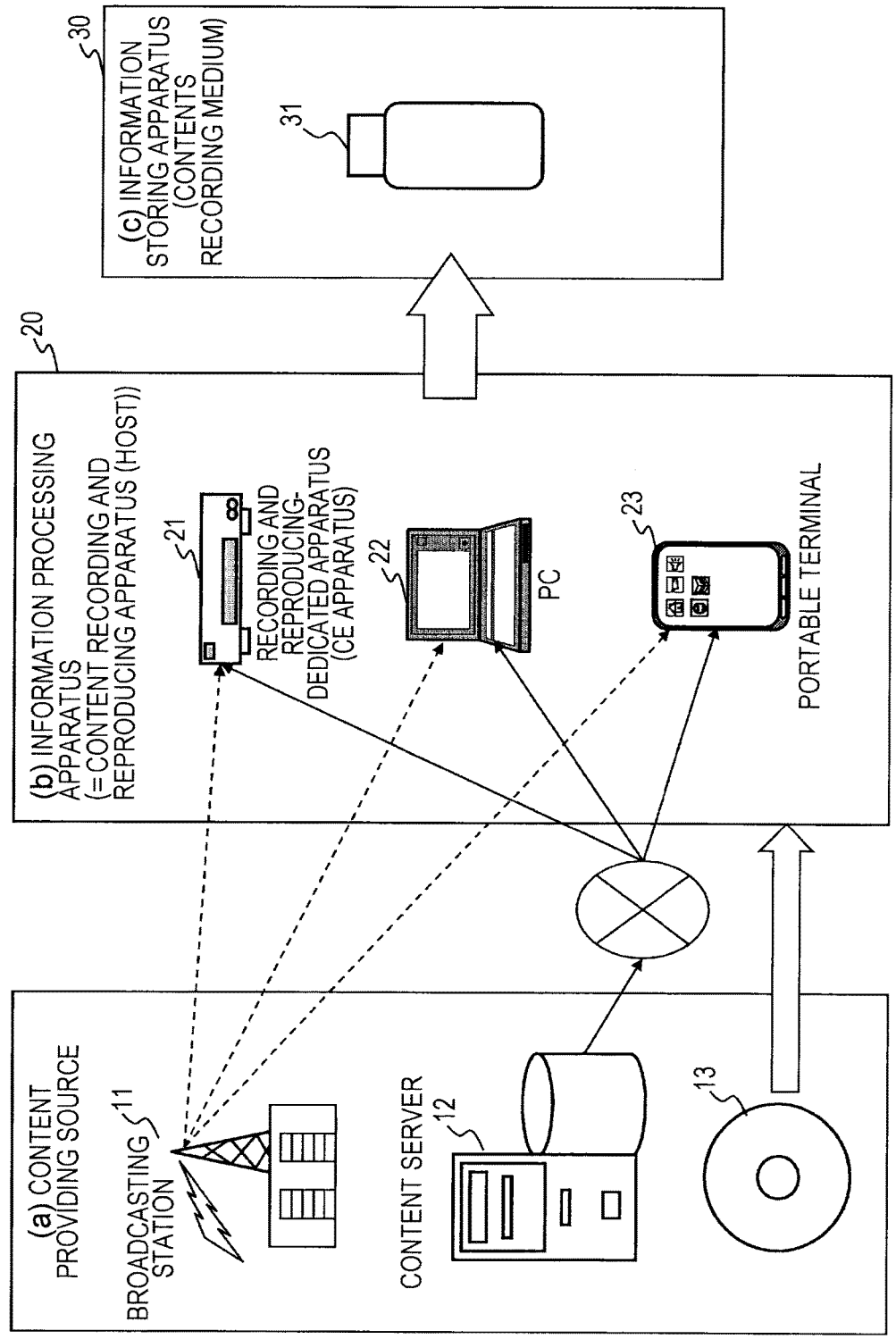
FIG. 1 is a diagram for describing outlines of content providing processing and content using processing.

An information storage device, an information processing system, and an information processing method, and a program are described in detail below referring to the drawings. Moreover, descriptions are provided under the following headings.

1. Outlines of Content Providing Processing and Using Processing

2. Configuration Example of an Information Storage Device

3. Basic Distribution Configuration of and Problems with an Encryption Key Set (MKS) for an Information Storage Device (Media)

4. Management Processing Based on a Media Key Binding Log that is Management Information corresponding to a Media Key Set and a Controller 5. Processing that Uses an Access Log to a Content Provision Server and a Media Key Binding Log 6. Sequence of Generating Processing and Registering Processing of a Media Key Binding Log and Registering Processing of an Access Log 7. Processing Example in which a Term of Validity is Assigned to a Media Key Set (MKS) and thus Management is Performed Based on the Term of Validity 8. Hardware Configuration Example of Each Apparatus 9. Configuration and Conclusions of the Present Disclosure 1. Outlines of Content Providing Processing and Using Processing An outline of a configuration of the present disclosure is described in detail referring to the drawings.

First, an outline of content providing processing and using processing is described referring to FIG. 1 and subsequent Figures.

FIG. 1 illustrates an example in which (a) a content providing source, (b) an information processing apparatus (content recording and reproducing apparatus (host)), and (c) an information storage device (content recording media) are arranged from left to right.

(c) The information storage device (content recording media) 30 is media that a user uses in recording content and thus performing reproducing processing of the content. Here, for example, a memory card 31 that is an information storage device, such as a flash memory, is illustrated.

For example, the user records various pieces of content such as music and a movie in the information storage device (content recording media) 30 such as a memory card 31 and thus uses the various pieces of content. For example, content and the like that are management objects for a copyright protection and content that is a use-controlled object are included in such pieces of content.

The use-controlled object is, for example, content, free copy or copy data distribution or the like of which is prohibited, content that is limited by use period, or the like. Moreover, if the use-controlled content is recorded in the memory card 31, usage control information (usage rule) corresponding to such content is additionally recorded.

Furthermore, provision and update processing is performed also on a revocation list to which an electronic signature is assigned, for example, by a private key of a license management apparatus (license authority (LA)) as a content management entity, with an identifier (ID) of an information processing apparatus 20 as an illegitimate apparatus or of the information storage device, or an identifier (ID) of key information being set to be registration data.

(a) The content providing source is a source for providing content such as music or a movie. As one example, FIG. 1 illustrates a broadcasting station 11, a content server 12, and a content recording media 13 such as BD or DVD as the content providing source.

The broadcasting station 11 is, for example, a television station, and imposes various pieces of broadcasting content onto a ground wave or a satellite wave and thus provides them to "(b) the information processing apparatus (content recording and reproducing apparatus (host)) that is a user apparatus."

The content server 12 is a server that provides the content such as the music or the movie over a network such as the Internet.

The content recording media 13 is media, such as a BD-ROM, a DVD-ROM, or the like, on which the content such as the movie or the like is recorded in advance.

The user can mount, for example, the memory card 31 into the information processing apparatus 20 and can record content that the information processing apparatus 20 receives from outside, or that is reproduced from the content recording media 13, on the memory card 31.

Furthermore, the information processing apparatus 20 can read and thus reproduce the content recorded, for example, on the memory card 31.

As the information processing apparatus 20, there is an apparatus 21 dedicated to recording and reproducing (consumer electronics apparatus: CE apparatus), such as a DVD player, that includes a hard disk, or a disk, such as DVD or BD. Moreover, there is a PC 22 or a portable terminal 23, such as a smart phone, a portable phone, a portable player, or a tablet terminal. All of these are apparatuses into which (c) the information storage device 30, for example, the memory card 31 is mountable.

Figure 2:
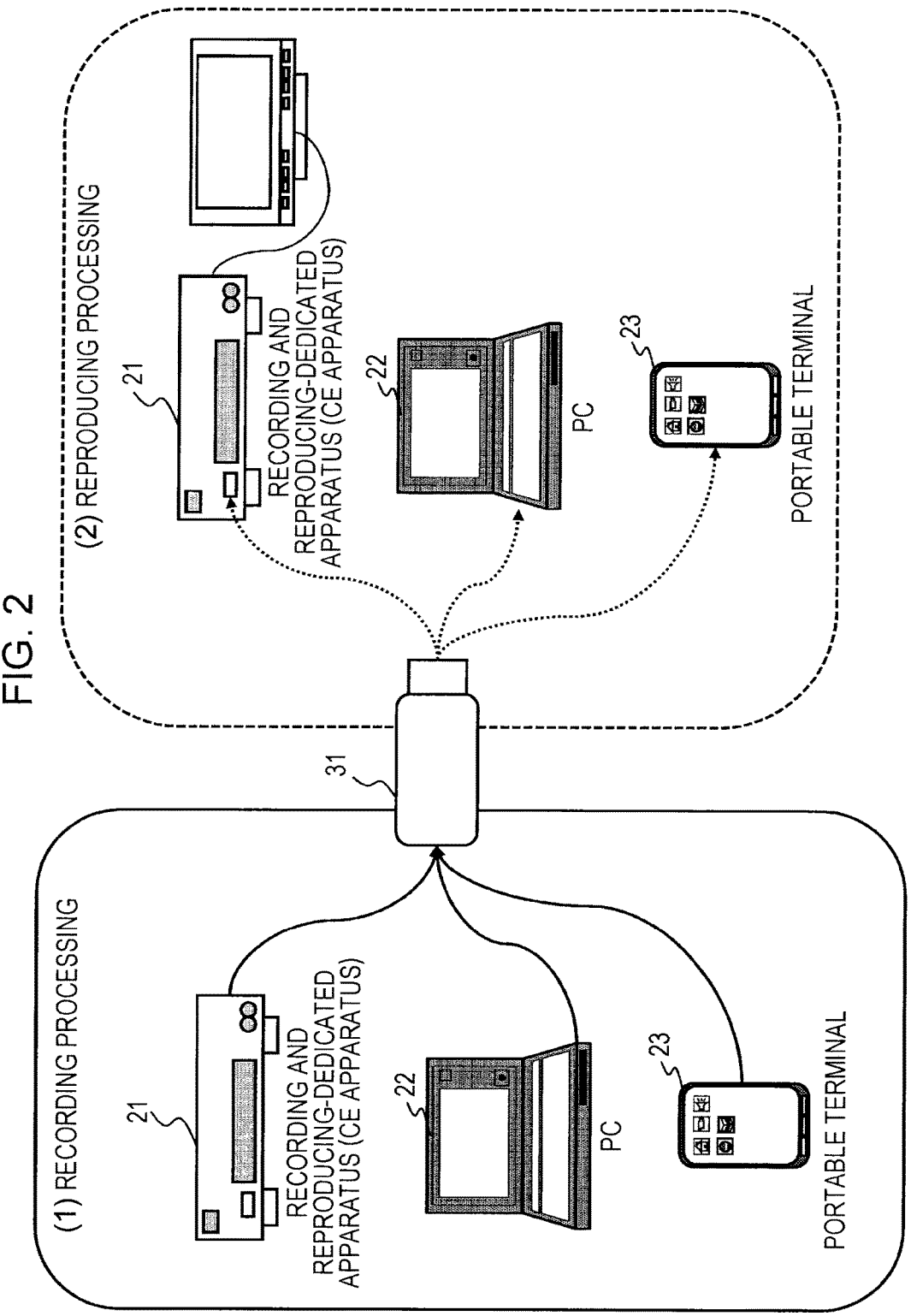
FIG. 2 is a diagram for describing a use type of content that is recorded in a memory card.

A use type of the memory card 31 is described referring to FIG. 2.

The memory card 31, which is one form of the information storage device 30, is a recording media that is removably mountable, for example, into a content reproducing apparatus such as a PC and is freely removable from the apparatus that performs content recording and thus is able to be mounted into other user equipment.

That is, as illustrated in FIG. 2, (1) recording processing and (2) reproducing processing are performed.

Moreover, there is an apparatus that performs only one of the recording and the reproducing.

Furthermore, it is not essential that the apparatus that performs the recording processing and the apparatus that performs the reprocessing processing are the same, and the user can select and thus freely use a recording apparatus or the reproducing apparatus.

Moreover, in most cases, the use-controlled content that is recorded on the memory card 31 is recorded as coded content, and the apparatus 21 dedicated to recording and reproducing or the PC 22, or a content reproducing apparatus such as the portable terminal 23, executes decrypting processing according to a predetermined sequence and then performs the content reproducing.

Furthermore, the reproducing processing and the like are performed in a use-allowed state that is recorded in the usage control information (usage rule) that is set to correspond to the content.

A program (host program) for executing content use or content decrypting processing according to the usage information control (usage rule) is stored in (b) the content recording and reproducing apparatus (host), and the content reproducing is executed according to the program (host application).

Furthermore, either of the information processing apparatus 20 that executes content recording and reproducing and the information storage device 30 that stores content puts the revocation list, which is a list in which the identifiers (ID) of the illegitimate devices are recorded, into a storage unit.

Figure 3:
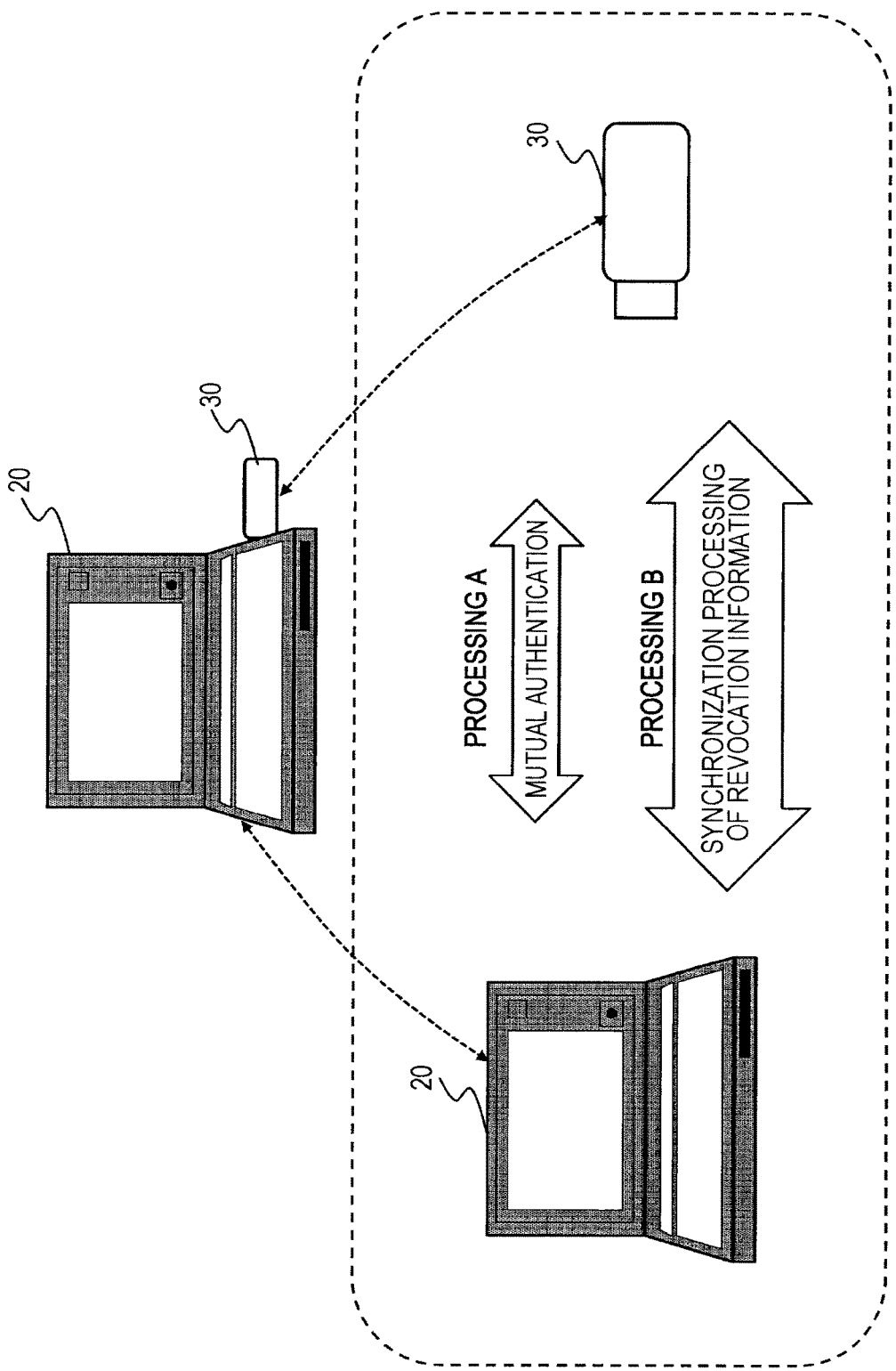
FIG. 3 is a diagram for describing processing between an information processing apparatus that executes content recording and content reproducing, and a content recording media.

When the information processing apparatus 20 such as the PC 22 is equipped with the information storage device 30 such as the memory card 31 and thus records content in the information storage device 30, or when the content stored in the information storage device 30 is reproduced, (processing A) mutual authentication processing between the information processing apparatus 20 and the information storage device 30, and (processing B) revocation list synchronization processing between the information processing apparatus 20 and the information storage device 30 are executed as prior processing as illustrated in FIG. 3.

The mutual authentication processing is executed according to an Elliptic Curve Diffie-Hellman (ECDH) encryption method that is a public key encryption algorithm.

Moreover, in the mutual authentication processing, processing is executed that uses a key set of a public key and a private key that are retained by the information processing apparatus 20 and the information storage device 30.

Furthermore, mutual providing processing of a public key certificate is performed between devices, and processing is performed that verifies whether or not an ID of a device or key of the other party or of the public key certificate is recorded in the revocation list that is a registration list of illegitimate devices. For example, if the ID of the device of the other party is recorded on the revocation list, it is determined that the device of the other party is an illegitimate device, and subsequent processing, for example, the content reprocessing or recording processing is not executed.

Revocation synchronization processing is processing that executes a version comparison between the revocation list retained by the information processing apparatus 20 and the revocation list retained by the information storage device 30 and thus selects the revocation list that is a newer version and updates the revocation list for the apparatus that retains the old revocation list, with a new one.

Update processing of the revocation list is called synchronization processing of the revocation list.

2. Configuration Example of an Information Storage Device

Next, a configuration example of the information storage device such as the memory card 31 that is used as a content recording media is described.

Figure 4:
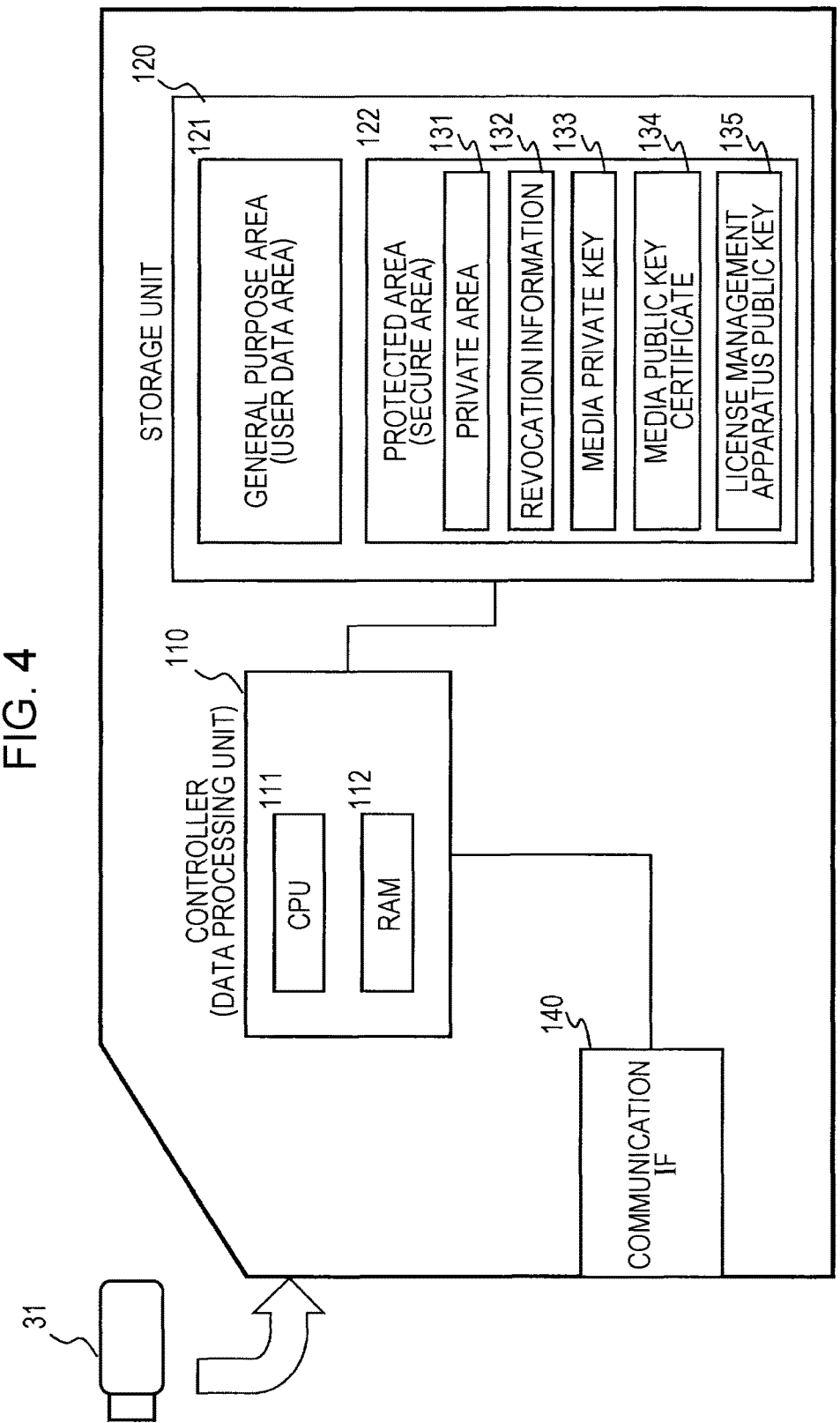
FIG. 4 is a diagram for describing a specific configuration example of the memory card.

A specific configuration example of the memory card 31 is illustrated in FIG. 4.

When the memory card 31 is mounted into the information processing apparatus (host apparatus) 20 that performs recording and reproducing of content, the information processing apparatus (host apparatus) 20 performs accessing, which entails authentication, on the memory card 31 and performs data reading or writing on the memory card 31.

The memory card 31, as illustrated in FIG. 4, has a controller (data processing unit) 110, a storage unit 120, and a communication IF 140.

For example, communication with the information processing apparatus (host apparatus) 20 is performed through the communication IF 140.

The controller (data processing unit) 110 is configured from a CPU 111 that has a function of executing a program, a RAM 112, and the like.

The storage unit 120 is divided into a general-purpose area (a user data area) 121 free access to which is basically allowed and a protected area (secure area) 122 free access to which is not allowed.

A private area 131 is provided in the protected area (secure area) 122 and various pieces of private information are recorded. Examples of private information are an encryption key (title key) that is applied to decrypting of content, and the like.

The encrypted content is recorded in the general-purpose area (user data area) 121.

A revocation list 132, a media private key 133, a media public key certificate 134, and a license management apparatus public key 135 are further recorded in the protected area (secure area) 122.

The revocation list 132 is a list with which identifiers of illegitimate devices, specifically, an information processing apparatus such as a recording and reproducing apparatus, or of a sex device such as an information storage device such as a memory card are registered. The revocation list 132 is configured in a manner that prevents falsification by using a signature of an issuer (license management apparatus).

The data processing unit 110 of the information storage device executes signature verification by applying the license management apparatus public key 135, checks legitimacy of the revocation list 132 by establishing the signature verification, and thus performs determination of the illegitimate devices, to which the revocation list 132 is applied.

The media private key 133 and the media public key certificate 134 are certificates in which the private key corresponding to the information storage device 30 according to a public key encryption method and the public key are stored. Moreover, the media means the information storage device.

First, as described referring to FIG. 3, the version comparison with the revocation list retained by the information processing apparatus 20 is performed at the time of the revocation list synchronization processing between the information processing apparatus 20 and the information storage device 30.

If the revocation list retained by the information processing apparatus (host) 20 is new, the revocation list retained by the information processing apparatus (host) 20 is obtained. Thus, the update processing is performed that updates the revocation list 132 of the information storage device 30 with new data.

On the one hand, if the revocation list 132 of the information storage device 30 is newer than the revocation list retained by the information processing apparatus (host) 20, the revocation list 132 of the information storage device 30 is output to the information processing apparatus (host) 20, and thus the update processing is performed that updates the revocation list of the information processing apparatus (host) 20 with new data.

Such processing is called the synchronization processing of the revocation list.

The information storage device 30 performs sharing of authentication and of a session key (=a bus key (BK)) between the information storage device 30 and the information processing apparatus (host) 20 before synchronization of the revocation list.

As a condition for establishing the mutual authentication, thereafter, communication of the private information between the information processing apparatus (host) 20 and the information storage device 30 is performed, if necessary, by encrypting that uses the session key (=the bus key (BK)) or by setting the signature data.

Various private pieces of information, as illustrated above, are recorded in the private area 131. Examples of private information are pieces of data such as the encryption key (title key) that is applied to decrypting of the content, and the like.

The private area 131 is divided into predetermined block units, and a specific apparatus such as a specific host is allowed to have access to each block unit.

3. Basic Distribution Configuration of and Problems with an Encryption Key Set for an Information Storage Device (Media) (MKS)

Figure 5:
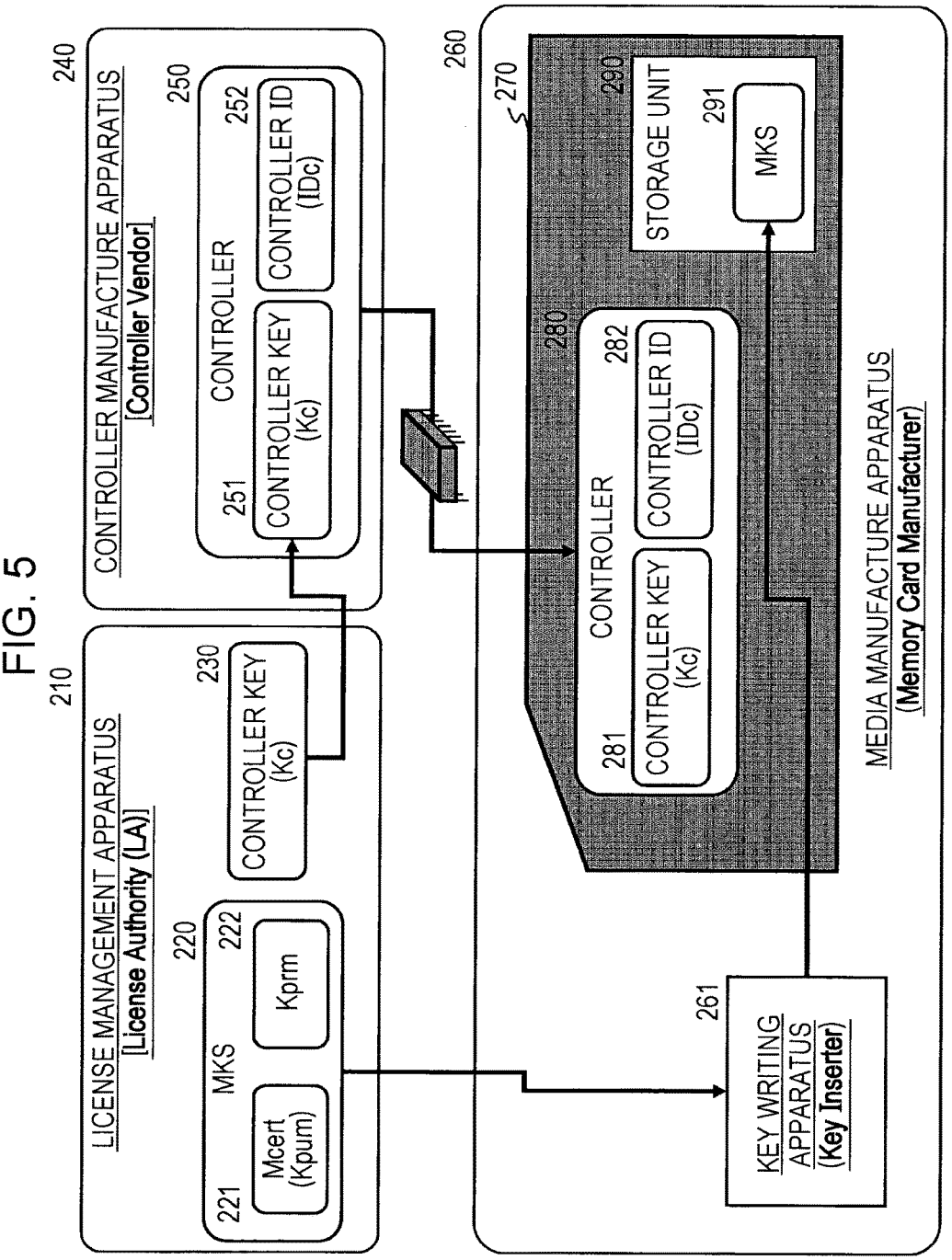
FIG. 5 is a diagram for describing a manufacturing process of the memory card.

Next, a basic distribution configuration of an encryption key set (media key set (MKS)) for the information storage device (media) is described referring to FIG. 5.

The encryption key set (media key set (MKS)) that is provided to the information storage device (media) is a key set of (a) the public key of the media (specifically, the public key certificate (media certificate) in which the public key is stored) and (b) the private key of the media.

The key set (MKS) is, as a general rule, a key set inherent to an individual media and is provided by a license management apparatus (LA) 210.

FIG. 5 illustrates (1) the license management apparatus (LA) 210 that performs providing processing of the key set (MKS), (2) a controller manufacturing apparatus 240 that manufactures the controller of the information storage device (media), and (3) a media manufacturing apparatus 260 that manufactures the information storage device (media).

The media manufacturing apparatus 260 manufactures the storage unit for recording content and the like, for example, a memory card 270 within which a flash memory is embedded. The memory card 270, for example, is equivalent to the memory card 31 that is described referring to FIG. 4. The memory card 270 has a controller 280 that functions as a data processing unit, and a storage unit 290.

In most cases, a controller manufacture maker and a media manufacture maker are separate makers, and the controller manufacture maker manufactures a controller that is intended to be embedded within the memory card, using the controller manufacturing apparatus 240. The media manufacture maker purchases the controller that is manufactured by the controller manufacture maker and thus mounts the purchased controller within the memory card 270.

The license management apparatus 210 generates media key sets (MKS) 220 that depend on the number of media to be manufactured and thus provides the generated media key set (MKS) to the media manufacturing apparatus 260.

The media key set (MKS) 220 is a set that has pieces of key information, that is, a public key certificate (Mcert) 221 in which a public key (Kpum) is stored, and a private key (Kprm) 222.

In addition, the license management apparatus 210 generates a controller key (Kc) 230 and thus provides the generated controller key (Kc) 230 to a controller vendor that manages the controller manufacturing apparatus 240.

The controller key (Kc) 230 is a key that is different in controller vendor units, and the license management apparatus 210 generates the controller key (Kc) that is different among controller vendors and thus provides the generated controller key (Kc) to the controller vendor that manages the controller manufacturing apparatus 240.

The controller vendor that manages the controller manufacturing apparatus 240 receives the controller key (Kc) that is generated by the license management apparatus 210, and thus stores a controller key (Kc) 251 in a manufactured controller 250. In addition, a controller ID (IDc) that is an identifier that is different from one controller 250 to another is recorded.

In this manner, in each controller unit, the controller manufacturing apparatus 240 manufactures the controller 250 in which the controller key (Kc) 251 in the controller vendor unit and the controller ID (IDc) 252 in the controller unit are recorded, and provides the manufactured controller 250 to the media manufacturing apparatus 260.

In this manner, the media manufacturing apparatus 260 receives a media key set 220 from a license providing apparatus 210 and receives the controller 250 from the controller manufacturing apparatus 240.

The memory card 270 is manufactured, as the media, using the pieces of received data.

The media manufacturing apparatus 260 mounts the controller that is received from the controller manufacturing apparatus 240, into the memory card 270. This is illustrated, as the controller 280, in the drawing. A controller key (Kc) 281 and a controller ID (IDc) 282 are recorded within the controller 280.

By retaining a key writing apparatus (key inserter) 261 and using the key writing apparatus 261, the media manufacturing apparatus 260 provides the media key set 220 that is received from the license providing apparatus 210, to the controller 280 of the memory card 270, and performs processing recording to the storage unit 290 under the control of the controller 280. The resulting written data is a media key set (MKS) 291 illustrated in the drawing.

In manufacturing processing of the memory card that is performed with this setting, for example, there is a likelihood that a memory card manufacture maker that retains the media manufacturing apparatus 260 will conduct an act of copying one media key set (MKS) that is received from the license providing apparatus 260, storing the same media key set (MKS) in multiple memory cards, and thus selling the multiple memory cards at a low price.

As described above, when such an act is conducted, it is difficult to manage content in media (memory card) units.

A configuration that prevents such an illegitimate act is described below.

4. Management Processing Based on a Media Key Binding Log that is Management Information Corresponding to a Media Key Set and a Controller According to one embodiment for preventing using processing that illegitimately copies the media key set, which is described above, management processing is described that is based on the media key binding log that is management information corresponding to the media key set and the controller.

Figure 6:
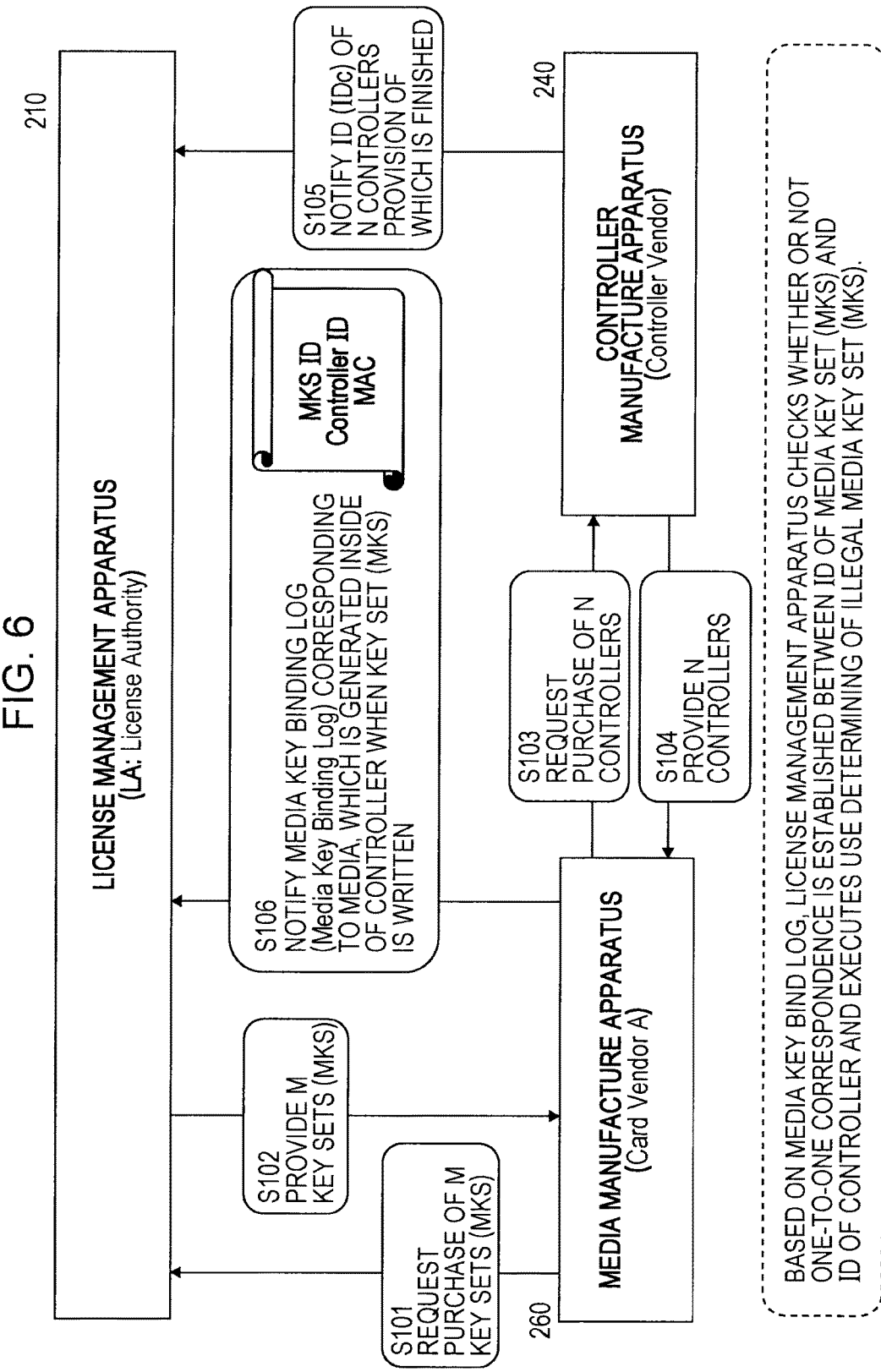
FIG. 6 is a diagram for describing the manufacturing process of the memory card.

FIG. 6 is a sequence diagram for describing processing according to the present embodiment.

Specifically, FIG. 6 is the sequence diagram for describing a flow of data between (1) the license management apparatus (LA) 210 that performs the providing processing of the key set (MKS), (2) the controller manufacturing apparatus 240 that manufactures the controller of the information storage device (media), and (3) the media manufacturing apparatus 260 that manufactures the information storage device (media) when manufacturing the media (memory card).

Processing in a sequence diagram illustrated in FIG. 6 is executed starting with Step S101 and ending with Step S106.

The processing is described below.

(Step S101)

First, a media maker that retains the media manufacturing apparatus 260 performs filing of an application notifying that the number of the manufacture-scheduled media is M, and makes a request for a purchase of M media key sets (MKS) with respect to the license management apparatus (LA) 210.

(Step S102)

The license management apparatus (LA) 210 provides as many (M) media key sets (MKS) as is requested by the media maker, to the media manufacturing apparatus 260.

As described above referring to FIG. 5, the media key set (MKS) is configured from a pair of the public key inherent to the media and the private key. The public key is stored within the public key certificate.

Figure 7:
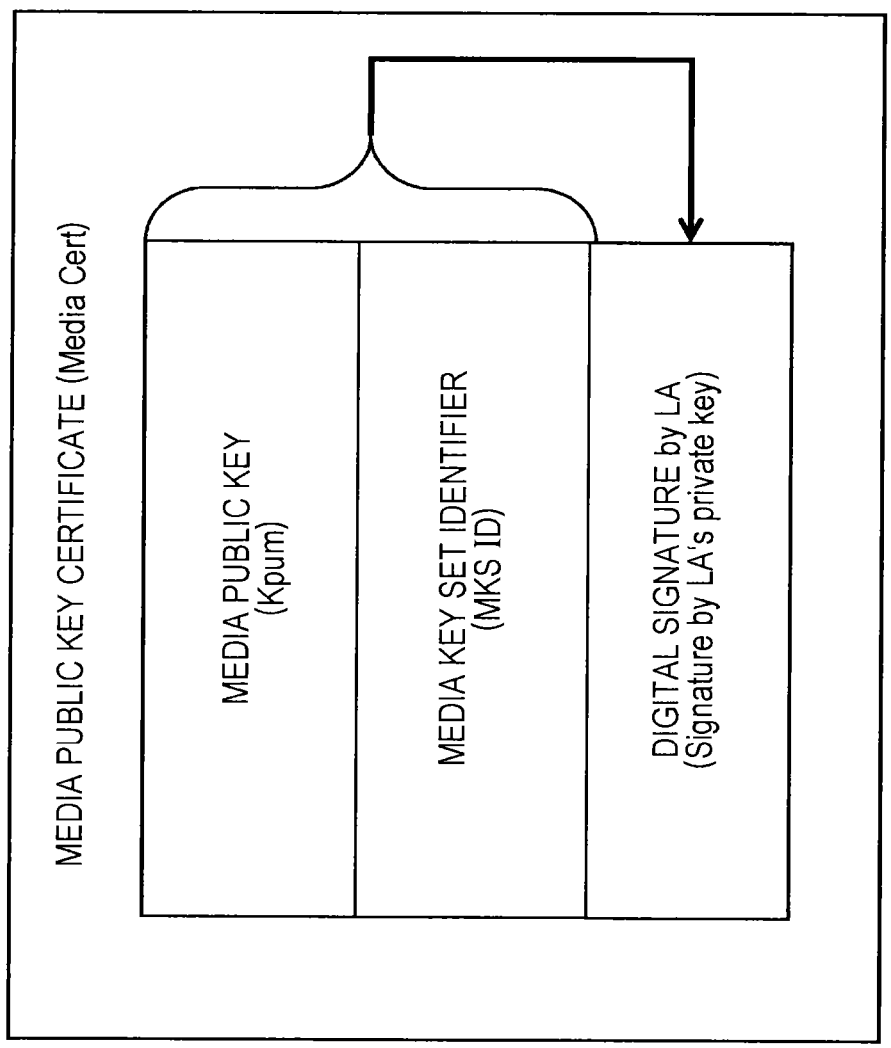
FIG. 7 is a diagram for describing a configuration example of a media public key certificate.

A data configuration example of one public key certificate corresponding to the media is illustrated in FIG. 7.

FIG. 7 is a diagram illustrating the data configuration example of the media public key certificate (media certificate) in which the media public key corresponding to one media is stored.

As illustrated in FIG. 7, pieces of data, such as (a) a media public key (Kpum), (b) a media key set identifier (MKS ID), and (c) a digital signature of the license management apparatus (LA), are recorded in the media public key certificate (media certificate).

(c) The digital signature of the license management apparatus (LA) is a digital signature that is set for (a) the media public key (Kpum) and (b) the media key set identifier (MKS ID).

If (a) the media public key (Kpum) is obtained from the media public key certificate (media certificate) and thus is used, the signature verification, that is, signature verification processing to which the public key of the license management apparatus (LA) is applied, is performed on (c) the digital signature of the license management apparatus (LA). This confirms that the data in the public key certificate is not falsified. (a) The media public key (Kpum) is obtained and thus is used under the condition that the signature verification is established and that it is confirmed that the data in the public key certificate is not falsified.

Moreover, (b) the media key set identifier (MKS ID) is recorded in the revocation list with which the identifiers (ID) of the illegitimate devices are registered. For example, the media public key certificate that is illustrated in FIG. 7 is provided to the host, at the time of the mutual authentication processing that is executed as processing that is executed prior to the reproducing and recording processing, between the host that performs the reproducing of the content recorded in the media, or the recording of the content on media, and the media. The host checks whether or not (b) the media key set identifier (MKS ID) is recorded in the revocation list. If the media key set identifier (MKS ID) is recorded, such a public key certificate is revoked and the mutual authentication processing is not established. The subsequent content reproducing or recording processing is not executed.

(Step S103)

Next, the media maker that retains the media manufacturing apparatus 260 makes a request for a purchase of N controllers to a controller maker that retains the controller manufacturing apparatus 240.

(Step S104)

Next, the controller maker provides the N controllers to the media maker.

As a general rule, any one of the number (M) of the media key sets that are purchased and the number (N) of the controllers that are purchased has to be consistent with the number of the manufacture-scheduled media (the memory cards), and M=N.

However, in some cases, the media maker that is going to conduct an illegitimate act plans for illegitimate processing that copies one media key set (MKS) into multiple media for storage and decreases the number M of the keys that are purchased. In such a case, M<N.

(Step S105)

The controller maker that retains the controller manufacturing apparatus 240 that provides the controller to the media manufacturing apparatus 260 notifies the license management apparatus (LA) 210 of the ID of the controller that is provided to the media manufacturing apparatus 260, that is, the controller ID (IDc) that is described referring to FIG. 5.

In this example, because the controller manufacturing apparatus 240 provides the N controllers to the media manufacturing apparatus 260, the controller manufacturing apparatus 240 generates a list of the N controller ID's (IDc) and thus notifies the license management apparatus (LA) 210 of the generated list.

(Step S106)

When writing the media key set (MKS) into the media (memory card), the media manufacturing apparatus 260 notifies the media key binding log that corresponds to the media that is generated inside of the controller within the media.

The processing that performs the recording of the media key set (MKS) in the storage unit of the media (memory card) is executed under the control of the controller of the media. That is, for example, if the media key set (MKS) is recorded in the storage unit 290 of the memory card 270 that is illustrated in FIG. 5, such recording processing is executed under the control of the controller 280.

At the time of such key writing processing, the controller executes the key writing processing and generating processing of the media key binding log, according to a sequence that is stipulated in advance. Moreover, such processing programs are recorded in the storage unit inside of the controller at the time of the manufacture of the controller in the controller manufacturing apparatus 240.

Figure 8:
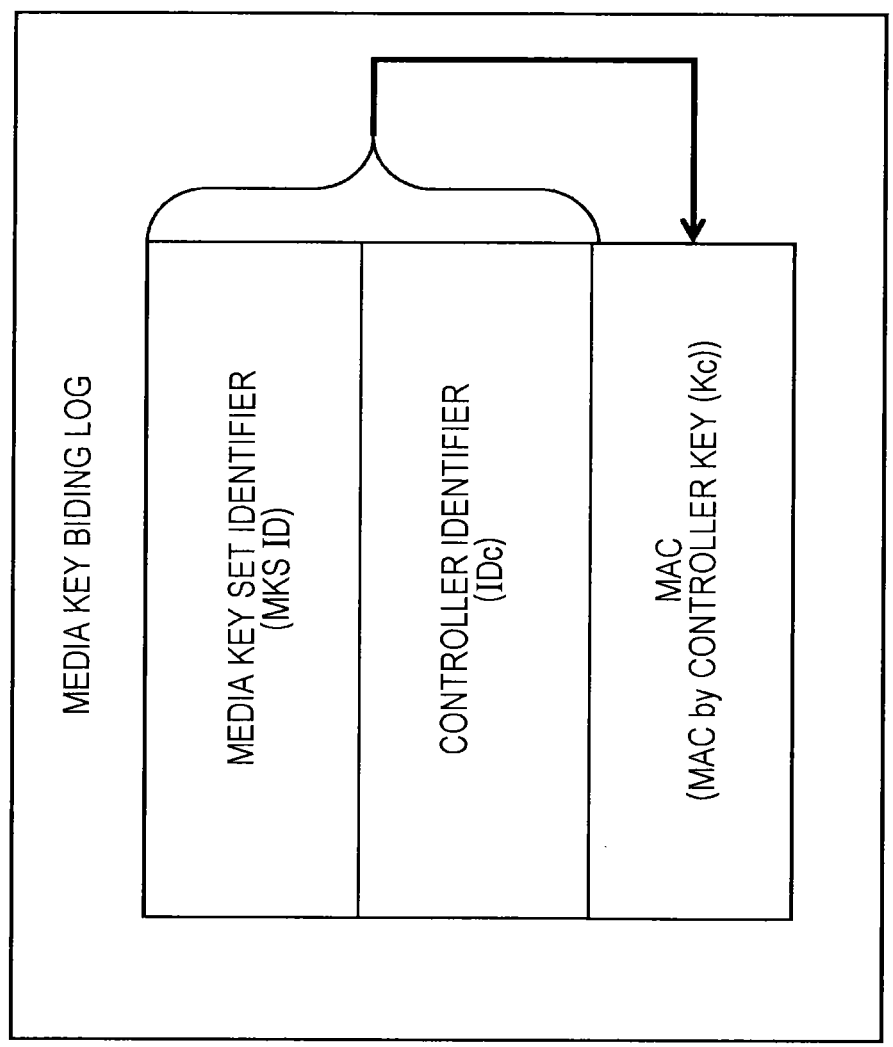
FIG. 8 is a diagram for describing a configuration example of data in a media key binding log.

A data configuration example of the media key binding log is described referring to FIG. 8.

As illustrated in FIG. 8, the following pieces of data are recorded in the media key binding log. Pieces of data, such as (a) the media key set identifier (MKS ID), (b) the controller identifier (IDc), and (c) a message authentication code (MAC) that is generated by applying the controller key (Kc), are recorded.

The MAC that is generated by applying (c) the controller key (Kc) is a MAC that is generated by applying the controller key (Kc) to (a) the media key set identification (MKS ID) and (b) the controller identifier (IDc).

If the use of the media key binding log is performed, first, processing is performed that executes MAC verification and thus confirms that the media key binding log is not falsified.

Moreover, the example illustrated in FIG. 8 is an example in which the MAC is set, but without being limited to the MAC, this may be possible with data by which it can be verified whether the media key binding log is falsified. For example, the setting may be performed using signature data or a hash value and the like.

The media key binding log illustrated in FIG. 8 is automatically generated when the media key set (MKS) is written in the controller inside of the media, and is provided to the license management apparatus (LA) through the key writing apparatus 261 that is illustrated in FIG. 5.

The license management apparatus (LA) stores all the media key binding logs in a management database and thus all the media key binding logs are retained there.

Based on the media key binding log, the license management apparatus 210 checks, for example, whether or not there is a one-to-one correspondence between the ID of the media key set (MKS) and the ID of the controller, and executes determination of whether an illegitimate media key set (MKS) is used.

5. Processing that Uses an Access Log to a Content Provision Server and a Media Key Binding Log For example, when a content provision server, which provides content, outputs the content, for recording, to the memory card being possessed by the user, the content provision server receives the media key set ID (MKS ID) and the controller ID (IDc) from the memory card that is a content recording destination, and transmits the pieces of ID information to the license management apparatus (LA).

The license management apparatus (LA), for example, can determine whether a combination of the pieces of ID information, that is, (a) the media key set ID (MKS ID) and (b) the controller ID (IDc) that are received from the content provision server is consistent with the registration data on the media key binding log that is received from the media maker, and can check for the presence of an illegitimate media.

Figure 9:
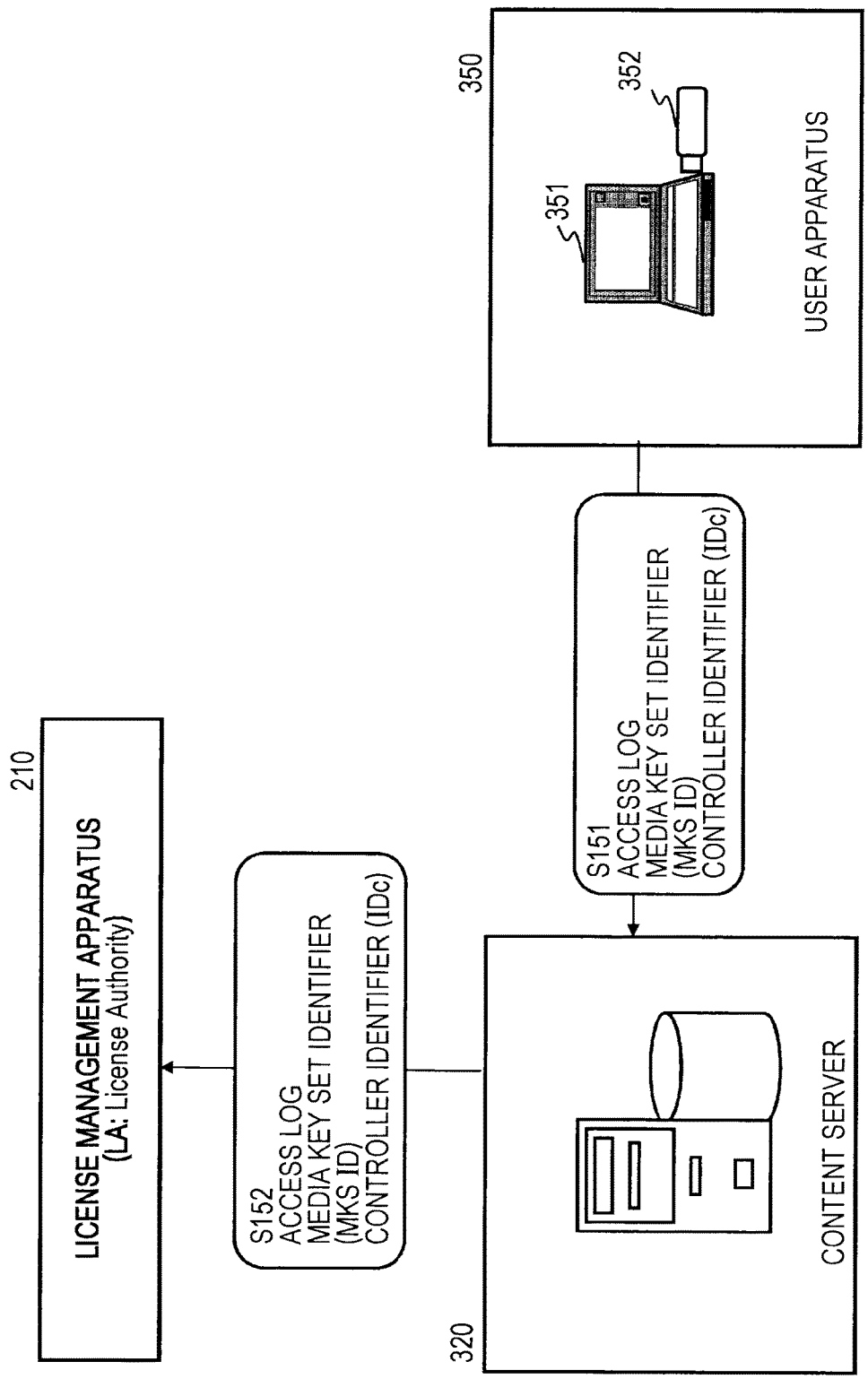
FIG. 9 is a diagram for describing a sequence of generating processing and collecting processing of an access log.

FIG. 9 is a diagram illustrating access log collection processing in the content provision server and a sequence for providing an access log to the license management apparatus (LA).

FIG. 9 illustrates the following apparatuses: (a) the license management apparatus (LA) 210; (b) the content provision server 320; and (c) the user apparatus 350.

The user apparatus 350 includes a PC 351 and a memory card 352 that is mounted into the PC 351, as illustrated in an example in the drawing, and the memory card 352 is used as the media for recording content.

The content provision server 320, for example, records the content in the memory card 352 through a network or the PC 351.

At the time of such content recording processing, the content server 320 executes the mutual authentication with the memory card 352 and provides the content under the condition that the authentication is established.

At the time of such content providing processing, in Step S151, the content server 320 obtains as access log information the media key set identifier (MKS ID) and the controller ID (IDc) that are retained by the memory card.

Moreover, the media key set identifier (MKS ID) can be obtained from the public key certificate that is provided from the memory card 352 at the time of the mutual authentication processing.

In Step S152, the content provision server 320 provides the media key set identifier (MKS ID) and the controller ID (IDc) that are obtained from the media that is a content providing destination, that is, from the memory card 352, as the access log information, to the license management apparatus 210.

Moreover, in an example in FIG. 9, the apparatus that provides the content to the memory card 352 of the user apparatus is illustrated as a content server, but a content provision apparatus with respect to the memory card is not limited to the content server. For example, the content provision apparatus may be an apparatus such as a public terminal that is installed in a public space such as a convenience store. Alternatively, a broadcasting station may be possible. In either case, the content provision apparatus also obtains the media key set identifier (MKS ID) and the controller ID (IDc) from the media that is the content recording destination, as the access log information, and thus provides the obtained information to the license management apparatus 210.

Figure 10:
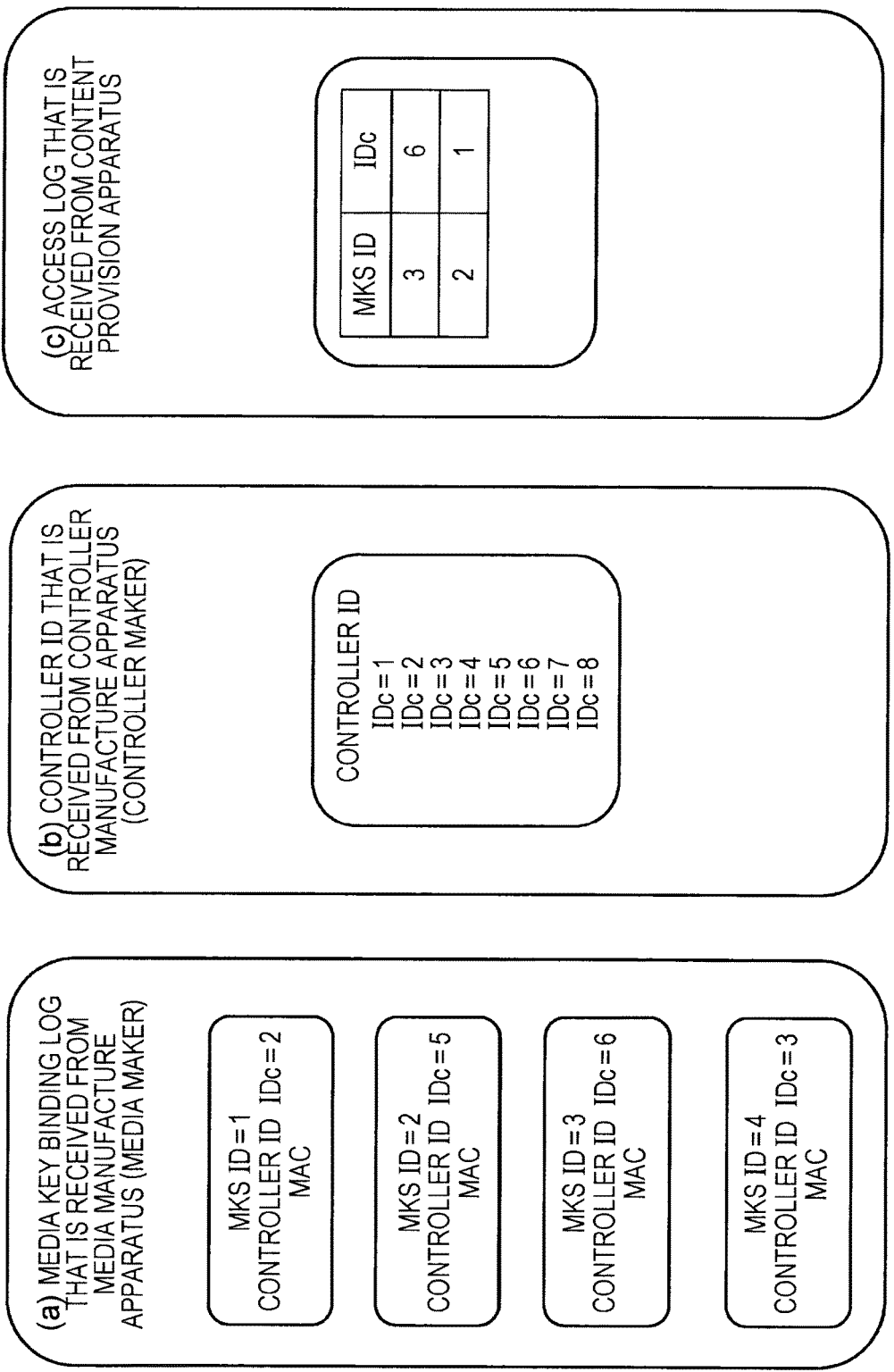
FIG. 10 is a diagram for describing an example of management data that is collected by a license management apparatus.

FIG. 10 illustrates an example of management information that is collected by the license management apparatus.

As illustrated in FIG. 10, the license management apparatus receives (a) the media key binding log (MKS ID, IDc, and MAC) from the media manufacturing apparatus, (b) the controller ID (IDc) from the controller manufacturing apparatus and (c) the access log (MKD ID and IDc) from the content provision apparatus.

By collating such pieces of data, the license management apparatus determines, for example, the presence or absence of the illegitimate media in which the illegitimate media key set (MKS) is stored. An example of such processing is described referring to FIG. 11.

Figure 11:
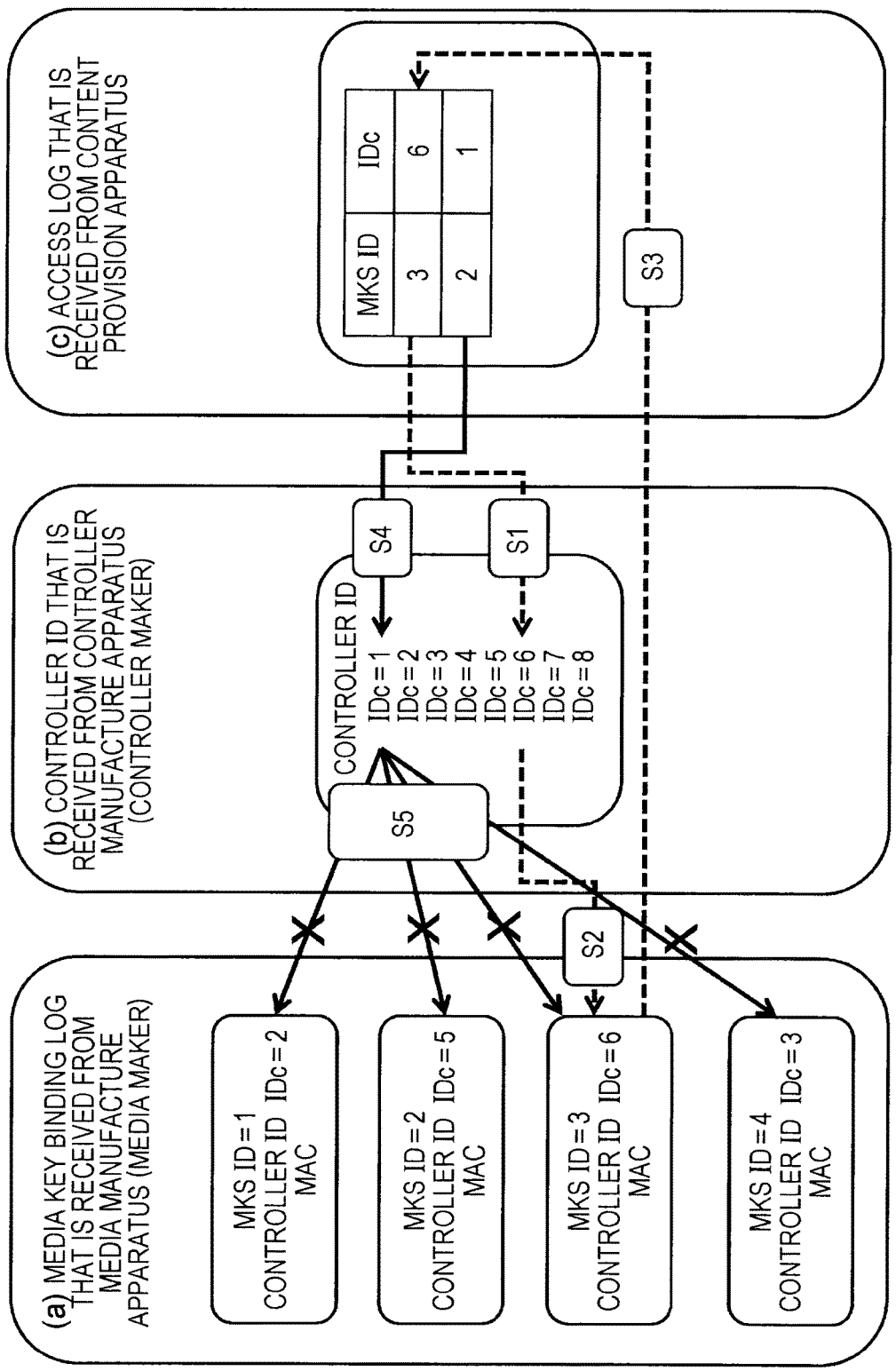
FIG. 11 is a diagram for describing one example of illegitimate detection processing to which the management data being collected by the license management apparatus is applied.

An example illustrated in FIG. 11 illustrates examples of the following pieces of data that the license management apparatus receives from each apparatus and records, as the management information, in the management database: (a) the media key binding log (MKS ID, IDc, and MAC) that is received from the media manufacturing apparatus; (b) the controller ID (IDc) that is received from the controller manufacturing apparatus; and (c) the access log (MKS ID and IDc) that is received from the content provision apparatus.

First, the license management apparatus makes reference to (c) the access log (MKS ID and IDc) that is received from the content provision apparatus, and (b) the controller ID (IDc) that is received from the controller manufacturing apparatus.

That is, the collation is performed on the controller ID (IDc) from (c) the access log that is received from the content provision apparatus and (b) the controller ID (IDc) that is received from the controller manufacturing apparatus.

Such processing is processing in each of Steps (S1) and (S4) illustrated in the drawing.

Next, the collation is performed on (c) the access log (MKS ID and IDc) that is received from the content provision apparatus and (a) the media key binding log (MKS ID, IDc, and MAC) that is received from the media manufacturing apparatus.

Such processing is processing in each of Steps (S2) and (S5).

In processing in Step (S2), (a) the media key binding log (MKS ID=3, IDc=6, and MAC) that has data equal to (c) the access log (MKS ID=3 and IDc=6) that is received from the content provision apparatus is detected.

As illustrated in Step (S3), consistent ID pairs, that is, a pair (MKS ID=3 and IDc=6) of the media key set identifier of (a) the media key binding log and the controller identifier, and a pair (MKS ID=3 and IDc=6) of the media key set identifier of the media key set identifier of (c) the access log and the controller identifier are detected.

It is determined that the pair (MKS ID=3 and IDc=6) of the media key set identifier and the controller identifier is for the media that is manufactured by a legitimate manufacturing process.

On the other hand, processing in Step (S5) illustrates that (a) the media key binding log (MKS ID, IDc, and MAC) that has pieces of data equal to (c) the access log (MKS ID=2 and IDc=1) that is received from the content provision apparatus are not detected.

In such a case, it is determined that a pair (MKS ID=2 and IDc=1) of the media key set identifier and the controller identifier that are obtained from such an access log is not for the media that is manufactured by the legitimate manufacturing process.

6. Sequence of Generating Processing and Registering Processing of a Media Key Binding Log and Registering Processing of an Access Log Next, a sequence of generating processing and registering processing, and managing processing of the media key binding log is described referring to FIGS. 12 and 13.

Figure 12:
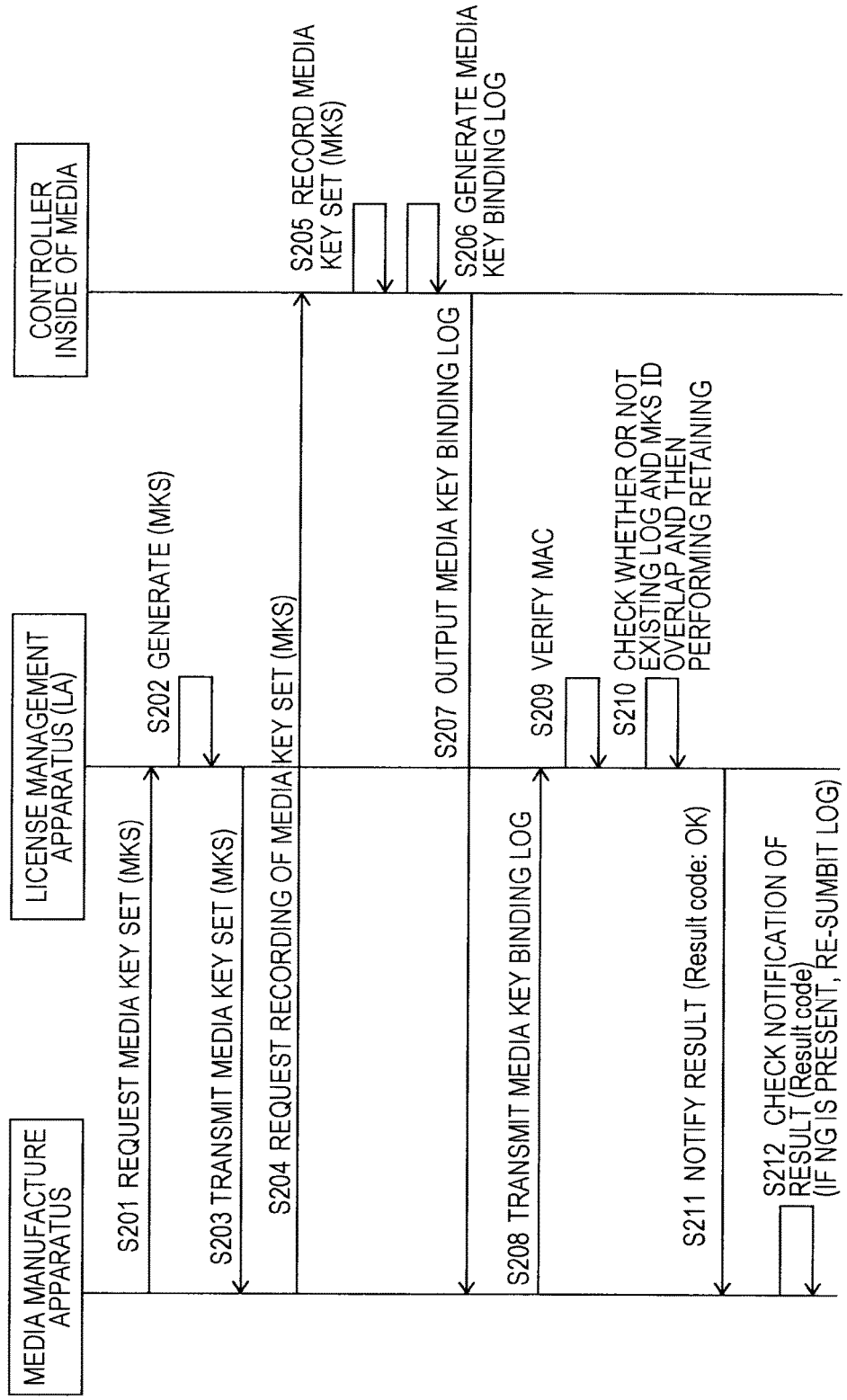
FIG. 12 is a diagram for describing a sequence of generating processing and registering processing of the media key binding log, which are executed at the time of processing that stores a media key set (MKS) in a media.
Figure 13:
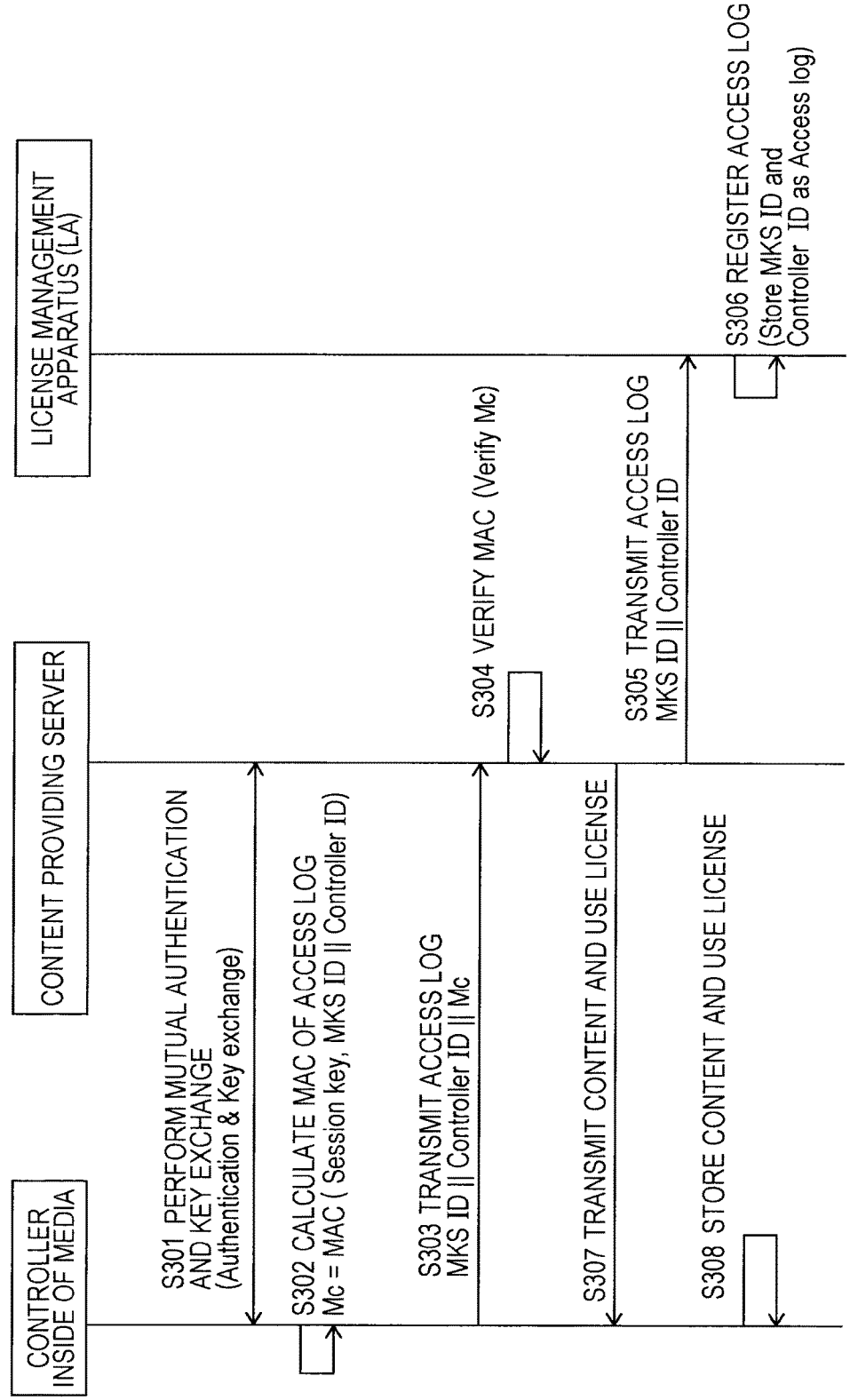
FIG. 13 is a diagram for describing a sequence of generating processing and registering processing of the access log, which are executed when content is provided to the media.

FIG. 12 is a diagram illustrating a sequence of generating processing and registering processing of the media key binding log, which is executed at the time of the storing processing of the media key set (MKS) in the media. FIG. 13 is a diagram illustrating a sequence of generating processing and registering processing of the access log, which is executed when content is provided to the media.

First, the sequence of generating processing and registering processing of the media key binding log that is executed at the time of the processing that stores the media key set (MKS) in the media is described referring to FIG. 12.

FIG. 12 illustrates a configuration in which the media manufacturing apparatus, the license management apparatus (LA), and the controller inside of the media are arranged from left to right, and illustrates processing from Step S201 to Step S212 that are executed between each component unit.

The processing in each step in FIG. 12 is sequentially described.

(Step S201)

First, the media manufacturing apparatus makes a request for the media key set (MKS) corresponding to the manufacture-scheduled media with respect to the license management apparatus (LA).

(Step S202)

The license management apparatus (LA) generates the media key set (MKS) in response to the request from the media manufacturing apparatus.

The media key set (MKS) is configured from the public key certificate in which the public key is stored, and the private key.

(Step S203)

The license management apparatus (LA) transmits the generated media key set (MKS), that is, the public key certificate in which the public key is stored, and the private key to the media manufacturing apparatus.

(Step S204)

The media manufacturing apparatus inputs the media key set (MKS), that is, the public key certificate, and the private key into the controller inside of the media, and thus performs writing processing of the media key set (MKS), on the storage unit inside of the media, that is, requests the storage unit to store the media key set (MKS).

(Step S205)

The controller inside of the media inputs the public key certificate and the private key for storing in the storage unit inside of the media.

(Step S206)

The controller inside of the media generates the media key binding log that has the data configuration that is described above referring to FIG. 8.

The media key binding log has such pieces of data as (a) the media key set identifier (MKS ID), (b) the controller identifier (IDc), and (c) MAC.

(Step S207)

The controller inside of the media outputs the generated media key binding log to the media manufacturing apparatus.

(Step S208)

The media manufacturing apparatus transmits the media key binding log to the license management apparatus (LA).

(Step S209)

The license management apparatus (LA) performs verification of the MAC that is a falsification verification value which is included in the media key binding log and confirms that the media key binding log is a legitimate log that is not falsified.

If the MAC verification fails and it is assumed that the media key binding log is falsified, the subsequent processing is not executed. In such a case, an error message is transmitted to the media manufacturing apparatus and thus the processing is ended. Alternatively, a log is requested to be re-transmitted.

(Step S210)

The license management apparatus (LA) further determines whether or not duplicate data is present in the media key set ID (MKS ID) and the controller ID (IDc) that are pieces of identification information that have been registered with the media key binding log that is already registered with the management database.

If the duplicate data is detected, the subsequent processing is not executed. In such a case, the error message is transmitted to the media manufacturing apparatus and thus the processing is ended. Alternatively, the log is requested to be re-transmitted.

(Step S211)

If the MAC verification succeeds, and further it is confirmed that duplicate data is not detected, the license management apparatus (LA) notifies the media manufacturing apparatus that the registering of the legitimate media key binding log is completed (Notification of the result=OK).

(Step S211)

The media manufacturing apparatus receives the notification of the result (OK) from the license management apparatus (LA) and ends the processing by ensuring that processing which registers the media key binding log is ended. If the notification of the result is NG, re-generation and re-transmission of the media key binding log are performed.

Next, the sequence of generating processing and registering processing of the access log, which is executed when the content is provided to the media is described referring to the sequence diagram illustrated in FIG. 13.

FIG. 13 illustrates a configuration in which the controller inside of the media, the content provision server, and the license management apparatus (LA) are arranged from left to right, and illustrates processing from Step S301 to Step S308 that are executed between each component unit.

The processing in each step in FIG. 13 is sequentially described.

(Step S301)

First, the mutual authentication processing and the key exchange processing are executed between the controller of the media that is the content recording destination, and the content provision server that is the content providing destination. Such processing is the mutual authentication processing and the key exchange processing according to a public key encryption method and performs generating of the session key that is shared between both of them.

Each apparatus performs the signature verification of the public key certificate of the other party, and further confirms that an apparatus ID that is recorded in the public key certificate is not recorded in the revocation list.

If the signature verification fails, or the apparatus ID is registered with the revocation list, the subsequent processing is not executed. That is, the content providing or recording processing, license issuing processing that allows the use of content, or the like is not executed.

(Step S302)

The controller inside of the media generates the access log that is transmitted to the content provision server and further generates the MAC (Mc) that is the falsification verification value for the access log. The MAC is generated by applying the session key.

A generation equation for the MAC (Mc) is as follows.

Mc=MAC (session key, MKS||IDc)

The above equation is an equation for describing the fact that the MAC is generated by applying the session key to data on a connection between the media key set ID (MKS ID) and the controller ID (IDc).

(Step S303)

The controller inside of the media transmits to the content provision server the access log of which constituent elements are the media key set ID (MKS ID) and the controller ID (IDc) and the MAC (Mc).

(Step S304)

The content provision server receives the access log and the MAC (Mc) from the controller inside of the media, and performs the MAC verification for ensuring legitimacy of the data.

If the MAC verification fails and the legitimacy of the data is not confirmed, the subsequent processing is discontinued. That is, the content recording processing is not executed.

(Step S305)

When the MAC verification succeeds in Step S304, and the legitimacy of the access log of which constituent elements are the media key set ID (MKS ID) and the controller ID (IDc) is confirmed, the content provision server transmits the access log to the license management apparatus (LA).

(Step S306)

The license management apparatus (LA) registers the access log being received from the content provision server with the management database.

(Step S307)

In addition, when the MAC verification succeeds in Step S304, and the legitimacy of the access log of which the constituent elements are the media key set ID (MKS ID) and the controller ID (IDc) is confirmed, in Step S307, the content provision server transmits content to be recorded in the media and license information that indicates the right to use the content, to the controller inside of the media.

(Step S308)

The controller inside of the media stores in the storage inside of the media the content and the license information that indicates the right to use the content, which are received from the content provision server.

With such processing, the content recording processing is performed on the media, and the access log, which is configured from the media key set ID (MKS ID) and the controller ID (IDc) that are retained by the media that executes the content recording, is registered with the license management apparatus (LA).

7. Processing Example in which a Term of Validity is Assigned to a Media Key Set (MKS) and thus Management is Performed Based on the Term of Validity Next, a processing example in which a term of validity is assigned to the media key set (MKS) and thus the management is performed based on the term of validity is described.

Figure 14:
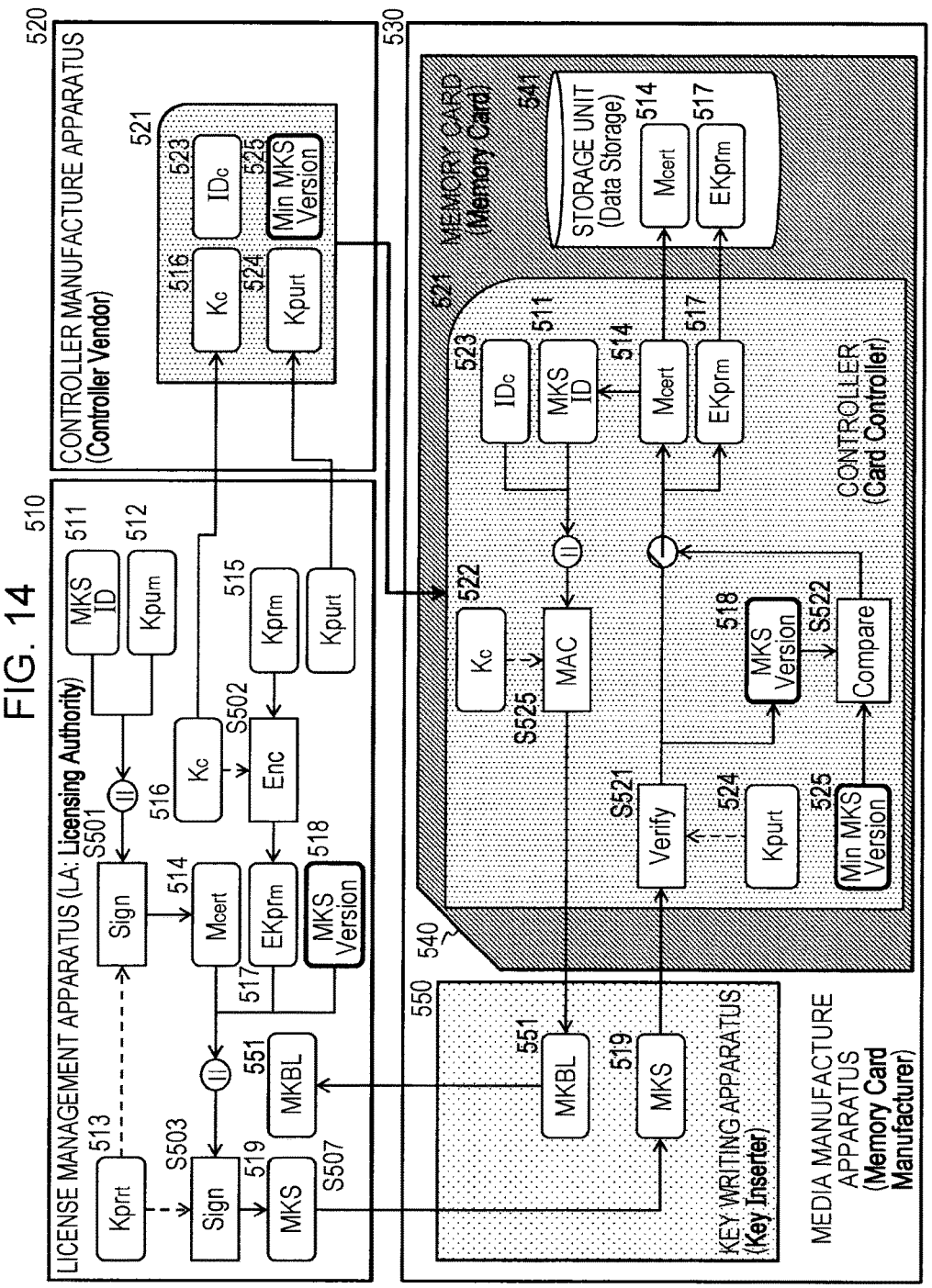
FIG. 14 is a diagram for describing a process of manufacturing a memory card.

The writing processing of the media key set (MKS), according to the present embodiment, is described referring to FIG. 14.

FIG. 14 illustrates a license management apparatus (LA) 510 that performs the providing processing of the key set (MKS), a controller manufacturing apparatus 520 (controller vendor) that manufactures the controller of the information storage device (media), and a media manufacturing apparatus (memory card manufacturer) 530 that manufactures the information storage device (media).

The media manufacturing apparatus 530 manufactures a memory card 540 within which a memory unit for recording content and the like, for example, a flash memory, is embedded. The memory card 540, for example, is equivalent to the memory card 31 that is described referring to FIG. 4. The memory card 540 has a controller 521 that functions as the data processing unit, and a storage unit 541.

The controller 521 is a controller 521 that is manufactured by the controller manufacturing apparatus (controller vendor) 520.

In most cases, the controller manufacture maker and the media manufacture maker are separate makers, and the controller manufacture maker manufactures the controller that is intended to be embedded within the memory card, using the controller manufacturing apparatus 520. The media manufacture maker purchases the controller that is manufactured by the controller manufacture maker and thus mounts the purchased controller within the memory card 540.

The license management apparatus 510 generates media key sets (MKS) 519 that depend on the number of media to be manufactured and thus provides the generated media key set (MKS) to the media manufacturing apparatus 530.

In the same manner as described according to the embodiment, the media key set (MKS) 519 is a set that has pieces of key information, that is, a public key certificate (Mcert) 221 in which the public key (Kpum) is stored, and the private key (Kprm) 222.

Moreover, according to the present embodiment, in addition to such pieces of key information, version information is recorded. Such data configurations are described in detail below.

In addition, the license management apparatus 510 generates a controller key (Kc) 516 and provides the generated controller key (Kc) 516 to the controller manufacturing apparatus 520.

The controller keys (Kc) 516, for example, are keys that are different in controller vendor units, and the license management apparatus 510 generates the controller keys (Kc) that are different in controller vendor units from each other and thus provides the generated controller keys (Kc) to the controller manufacturing apparatus 520.

The controller manufacturing apparatus 520 receives the controller key (Kc) from the license management apparatus 510, and thus stores the controller key (Kc) 516 in every manufactured controller 521. In addition, a controller ID (IDc) 523 that is an identifier that differs in every controller 521, and a license management apparatus public key (Kpurt) that is received from the license management apparatus 510 are recorded.

In addition, a controller allowance minimum MKS version (Min MKS version) 525 is recorded.

According to the present embodiment, the license management apparatus (LA) 510 is generated, and version information (MKS version) 518 that depends on the generation date and time retained in the media key set (MKS) 519 is recorded in the media key set (MKS) 519 that is provided to the media manufacturing apparatus 530. Specifically, for example, the version information is set in the following manner: MKS generated in January to June 2012: Version 0 (Ver. 0); MKS generated in July to December 2012: Version 1 (Ver. 1); and MKS generated in January to June 2013: Version 2 (Ver. 2).

In addition, the controller manufacturing apparatus 520 that manufactures the controller 521 that is stored in the memory card 540 records a minimum value of a version (MKS Version) of the media key set (MKS) that allows the memory card 540 to be written, within the controller 521. The minimum value is the "controller allowance MKS version (Min MKS Version) 525.

The controller 521 in which the controller allowance minimum MKS version (Min MKS Version) 525 is recorded is provided to the media manufacturing apparatus 530 and is built into the memory card 540.

A sequence for manufacturing the memory card 540 is described referring to FIG. 14.

First, the license management apparatus (LA) 510 is described.

The license management apparatus (LA) 510 performs generating of the media key set (MKS) 519 that is provided to the media manufacturing apparatus 530.

First, a media key set identifier (MKS ID) 511 and a media public key (KPum) 512 that are pieces of storage data retained in the media key set (MKS) 519 are generated, and a license management apparatus private key (Kprrt) 513 is applied to such pieces of connection data and thus the digital signature is generated in Step S501.

As a result, a media public key certificate 514 is generated that is data-configured from the media key set identifier (MKS ID) 511, the media public key (KPum) 512, and the digital signature.

The media public key certificate 514 has the configuration described above referring to FIG. 7.

In addition, the license management apparatus (LA) 510 generates a media private key (Kprm) 515 and generates the controller key (Kc) 516 corresponding to each controller vendor.

In Step S502, the media private key (Kprm) 515 is encrypted with the controller key (Kc) 516, and an encrypted media private key (EKprm) 517 is generated.

Next, pieces of data, such as the media public key certificate (Mcert) 514, the encrypted media private key (EKprm) 517, and a version information (MKS Version) 518 that depends on the manufacturing date and time of the MKS are connected to one another, the license management apparatus private key (Kprrt) 513 is applied to the connection data and thus the digital signature is generated in Step S503.

As a result, the media key set (MKS) 519 is generated that is data-configured from the media public key certificate (Mcert) 514, the encrypted media private key (EKprm) 517, the version information (MKS Version) 518, and the digital signature.

Figure 15:
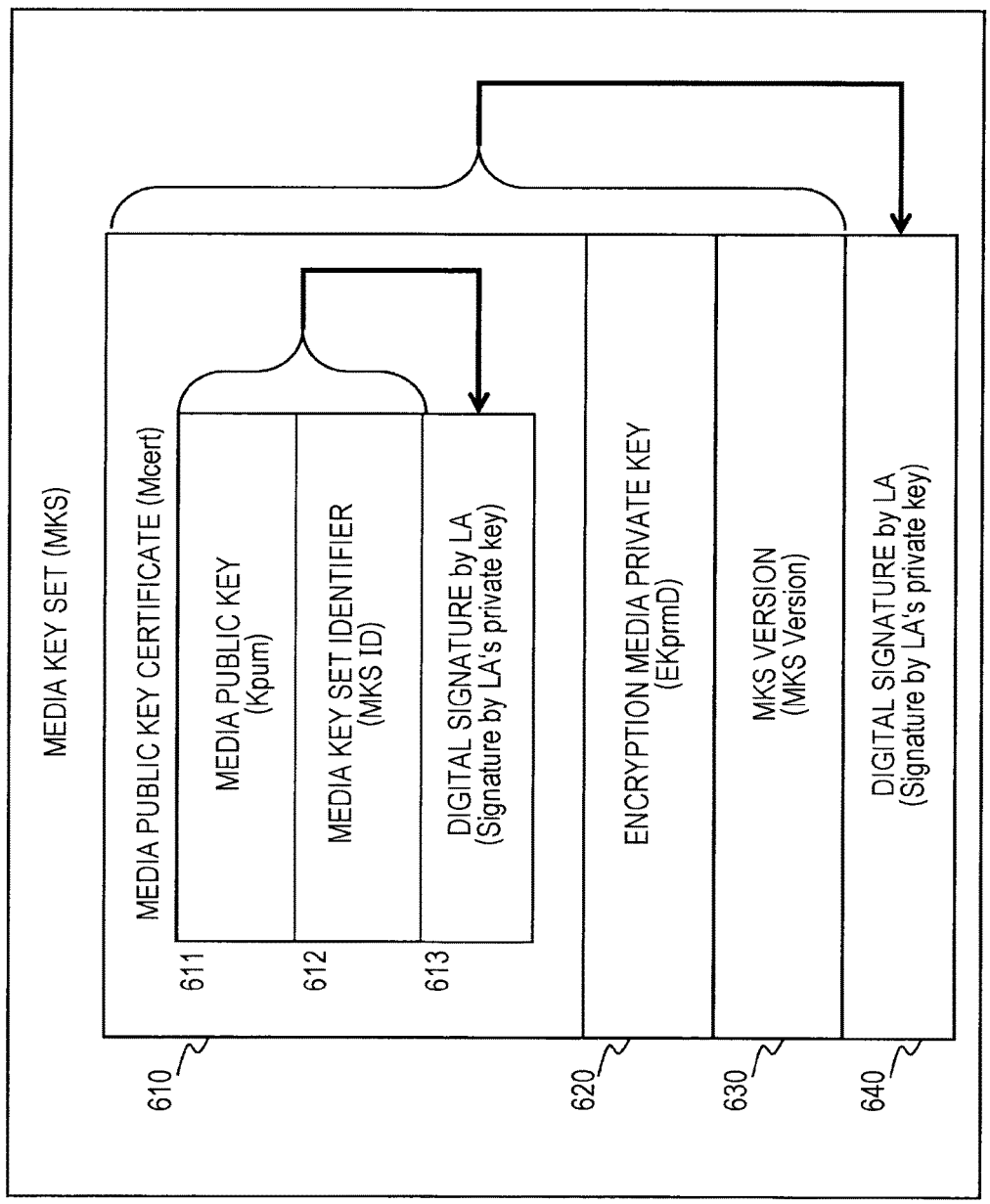
FIG. 15 is a diagram for describing a data-configuration example of the media key set (MKS)

FIG. 15 illustrates the data configuration example of the media key set (MKS) 519.

As illustrated in FIG. 15, the media key set has pieces of data, such as (a) a media public key certificate (Mcert) 610, (b) an encrypted media private key (EKprm) 620, (c) an MKS version 630, and (d) a digital signature 640 of the license management apparatus (LA).

The media public key certificate (Mcert) 610, as described above referring to FIG. 7, has pieces of data, such as (a1) the media public key (Kpum), (a2) the media key set identifier (MKS ID), and (a3) the digital signature of the license management apparatus (LA).

The license management apparatus (LA) 510 illustrated in FIG. 14 generates the media key set (MKS) that is data-configured as illustrated in FIG. 15 and thus provides the generated media key set (MKs) to the media manufacturing apparatus 530.

The media manufacturing apparatus 530 receives the media key set (MKS) 519 that is data-configured as illustrated in FIG. 15 and thus performs processing that records the received media key set (MKS) 519 in the memory card 540 to be manufactured.

As illustrated in FIG. 15, the media manufacturing apparatus 530 performs the key writing processing using a key writing apparatus (key inserter) 550.

As described above, the memory card 540 has the controller 521 and the storage unit 541, and the writing processing of the MKS is executed under the control of the controller 521.

The controller 521 is a controller that is manufactured in the controller manufacturing apparatus 520, and retains pieces of data, such as the controller key (Kc) 516, the controller ID (IDc) 523, the license management apparatus public key (Kpurt), and a controller allowance minimum MKS version (Min MKS Version) 525.

First, the key writing apparatus 550 outputs to the controller 521 of the memory card 540 the media key set (MKS) 519 that is received from the license management apparatus (LA) 510.

In Step S521, the controller 521 executes the signature verification of the digital signature that is set to be in the media key set (MKS). The signature verification is executed using a license management apparatus (LA) public key (Kpurt) 524 that has been stored in the controller 521.

With the signature verification, the presence or absence of the falsification in the MKS is determined. When it is confirmed that the falsification is absent in the MKS the signature verification of which is established, proceeding to the next processing takes place.

If the signature verification is not established and it is not confirmed that the falsification is absent in the MKS, the processing is discontinued without proceeding to the next processing. In such a case, MKS recording processing is not executed.

When it is confirmed that the falsification is absent in the MKS the signature verification of which is established, next, the controller reads an MKS version 518 that is recoded data in the media key set (MKS).

In Step S522, the controller performs processing that makes a comparison between the controller allowance minimum MKS version (Min MKS Version) 525 that has been recorded as data within the controller and the MKS version 518 that is recorded data in the MKS.

With the version comparison, writing allowance determining of the media key set (MKS) is executed.

Figure 16:
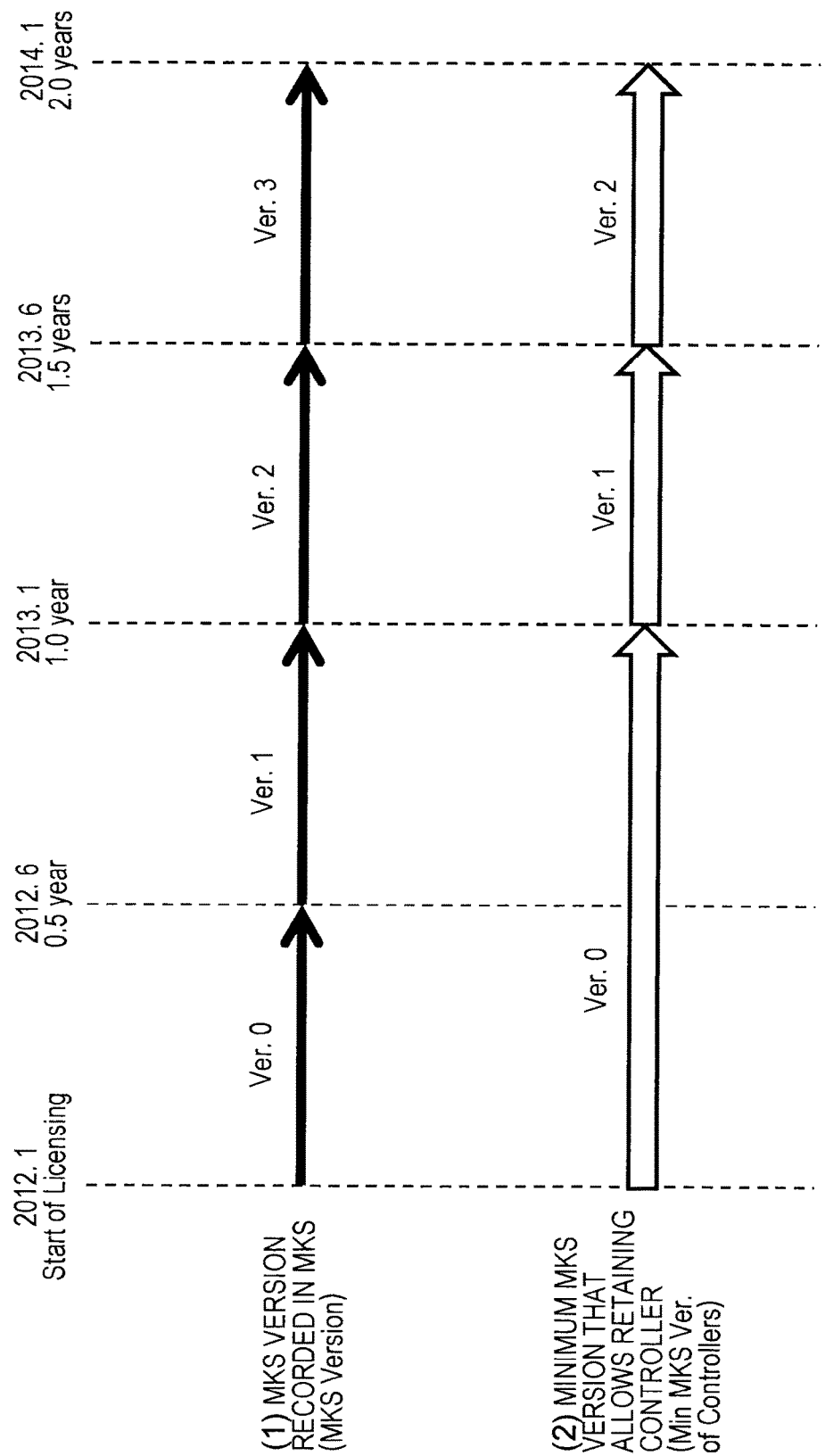
FIG. 16 is a diagram for describing an example of setting an MKS version that is recorded in the media key set (MKS) and a controller allowance minimum MKS version that is recorded by the controller.

The allowance determining processing is described in detail referring to FIG. 16.

FIG. 16 illustrates an example of setting (1) the MKS version that is recorded in the MKS and (2) the controller allowance minimum MKS version that is retained by the controller.

In an example in the drawing, (1) the MKS version that is recorded in the MKS is updated every half year. That is, the setting is provided as follows. The MKS that is generated in January to June 2012 is Version 0, the MKS that is generated in July to December 2012 is Version 1, the MKS that is generated in January to June 2013 is Version 2, and the MKS that is generated in July to December 2013 is Version 3.

On the other hand, (2) the controller allowance minimum MKS version that is retained by the controller is set as follows.

The allowance minimum version 0 is set to be in the controller that is manufactured in January to December 2012, the allowance minimum version 1 is set to be in the controller that is manufactured in January to June 2013, the allowance minimum version 2 is set to be in the controller that is manufactured in July to December 2013, and so forth.

If the MKS version that is input along with a key writing request is equal to or newer than the allowance minimum version recorded in the controller, pieces of key data (Mcert and EKprm) in the MKS are recorded in the storage unit 541.

However, if the MKS version that is input is older than the allowance minimum version that is recorded in the controller, the processing is not performed that records the pieces of key data (Mcert and EKprm) in the MKS in the storage unit 541.

Specifically, in an example in FIG. 16, the controller in which the allowance minimum version 0 is recorded allows the recording of all of the MKS's that have the MKS versions of the MKS=0, 1, 2, 3, and so forth.

On the other hand, the controller in which the allowance minimum version 1 is recorded allows the recording of the MKS's that have the MKS versions of the MKS=1, 2, 3, and so forth. However, the recording of the MKS that has the MKS version=0 is not performed.

Furthermore, the controller in which the allowance minimum version 2 is recorded allows the recording of the MKS's that have the MKS versions of the MKS=2, 3, and so forth. However, the recording of the MKS's that have the MKS versions=0 and 1 is not performed.

In this manner, the newer controller is set in such a manner as not to perform the recording of the MKS that has an older version.

With the comparing processing (compare) in Step S522 that is executed by the controller 521 of the memory card 540 which is manufactured by the media manufacturing apparatus that is illustrated in FIG. 14, such version comparing processing is executed and thus the allowance determining of the MKS writing processing is performed.

That is, in Step S522, if it is determined that the allowance minimum version≤the MKS version, proceeding to the recording processing of the MKS takes place.

On the other hand, in Step S522, if it is determined that the allowance minimum version>the MKS version, the processing is discontinued without executing the recording processing of the MKS.

In Step S522, if it is determined that the allowance minimum version the MKS version, the controller 521 writes into the storage unit 541 the media public key certificate (Mcert) 514 and the encrypted media private key (EKprm) 517 that are obtained from the MKS 519.

In addition, according to the writing processing of the MKS, the controller executes generating processing and outputting processing of a media key binding log (MKBL) 551 described above.

First, an MKS ID 511 is read from a media key public key certificate (MCert) 514 and is connected to a controller identifier (IDc) 523, and thus in Step S525, a MAC generating processing to which the controller key (Kc) is applied is executed.

With such processing, the media key binding log (MKBL) 551 is generated and is output.

As described above referring to FIG. 8, the pieces of data, such as (a) the media key set identifier (MKS ID), (b) the controller identifier (IDc), and (c) the message authentication code (MAC) that is generated by applying the controller key (Kc), are recorded in the media key binding log (MKBL) 551.

The media key binding log (MKBL) 551 is output to the license management apparatus (LA) 510 through the key writing apparatus 550.

The license management apparatus (LA) 510 records the media key binding log (MKBL) 551, as the management information, in the management database and manages the recorded media key binding log (MKBL) 551.

Moreover, the processing by the controller, which is described referring to FIG. 14, is executed according to a program that is recorded in advance within the controller. Such a program is a program that is recorded within the controller at the time of the manufacturing of the controller 521 in the controller manufacturing apparatus 520.

In this manner, according to the present embodiment, at the time of the recording of the media key set (MKS) in the media (memory card), a comparison is executed between the MKS version that is recorded within the MKS and the allowance minimum MKS version that is recorded within the controller, and thus according to a result of the comparison, the allowance determining of the recording of the MKS is executed.

With such processing, it is possible, for example, to prevent illegitimate recording processing of the MKS that indefinitely records copy data in an old MKS into a new memory card.

Figure 17:
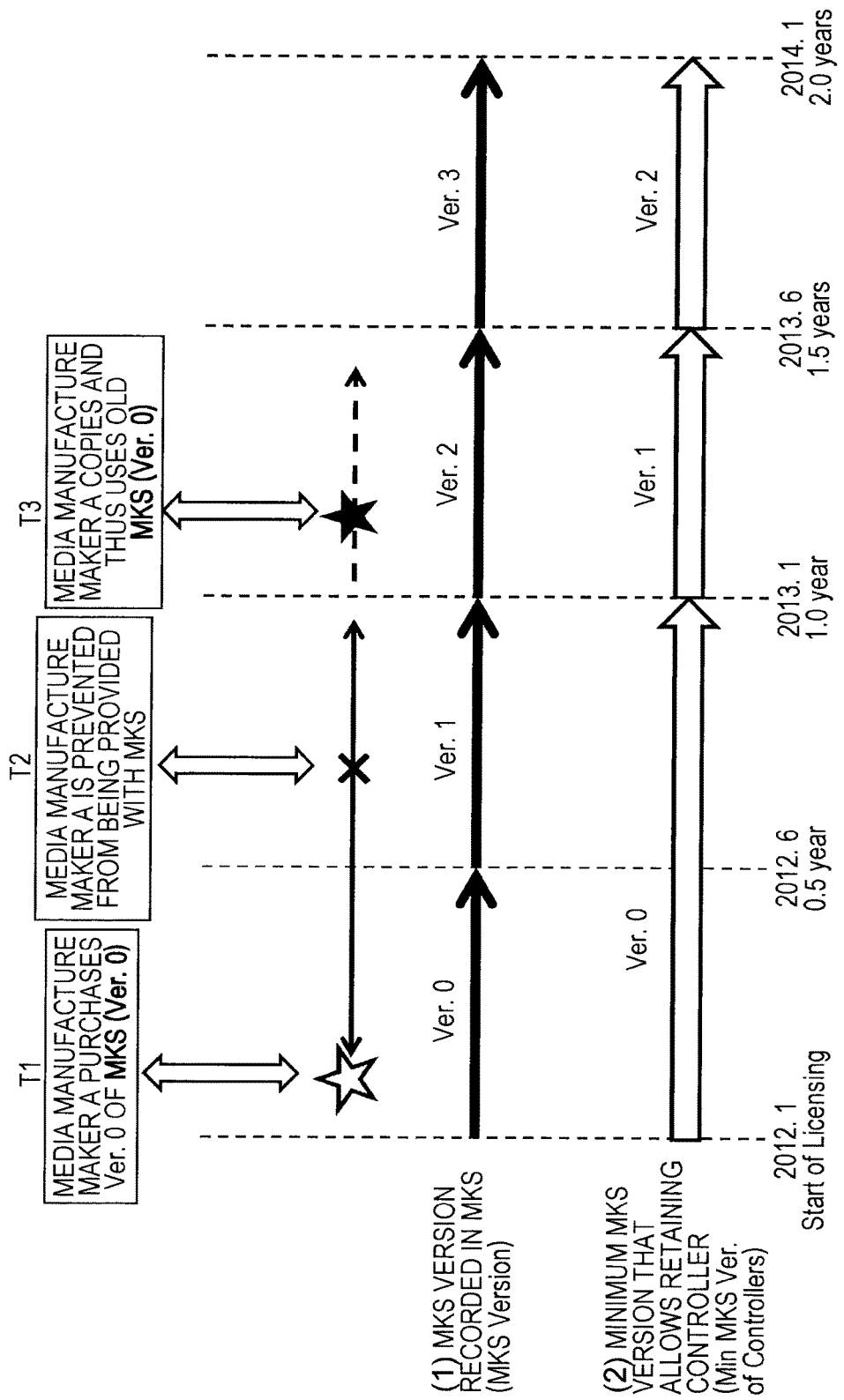
FIG. 17 is a diagram for describing an example of using the MKS version that is recorded in the media key set (MKS) and the controller allowance minimum MKS version that is recorded by the controller.

An example of preventing the illegitimate processing is described in detail referring to FIG. 17.

As illustrated in FIG. 17, it is assumed that a certain media maker A regularly purchases an MKS from the license management apparatus (LA) at a point in time T0.

The MKS version=0 is recorded in the MKS at this time.

Thereafter, the media maker A can store the regularly-purchased MKS in the media (memory card) and thus sell the media (memory card) in which the regularly-purchased MKS is stored.

However, it is assumed that the license management apparatus (LA) discontinues the providing of the MKS to the media maker A at a point in time T2.

It is assumed that because the media maker A continues to manufacture and sell the media (memory card) thereafter, the media maker A is going to create copy data in the already-purchased MKS, store the copy data in a memory card, and thus sell the memory card. For example, at a point in time T3 or later, the media maker A plans to generate and thus use a copy of the MKS having the old version, that is, the MKS version=0.

If the media maker A is going to conduct such an illegitimate act, due to the version comparing processing that is executed within the controller, it is impossible to record the MKS having the old version.

For example, the allowance minimum MKS version=1 is set to be in the controller that is manufactured, with a dictionary at a point in time T3, by the controller manufacturing apparatus, and thus is provided to the media manufacturing apparatus.

Such a controller allows the recording of only the MKS having the MKS version, that is, the allowance minimum MKS version=1 or newer.

That is, the writing processing of the MKS having the old MKS having the MKS version=0 is not allowed.

Therefore, the manufacturing of the memory card in which the MKS having the old version is stored is prevented, and the memory card into which the illegitimate key is written can be prevented from circulating in the market.

Figure 18:
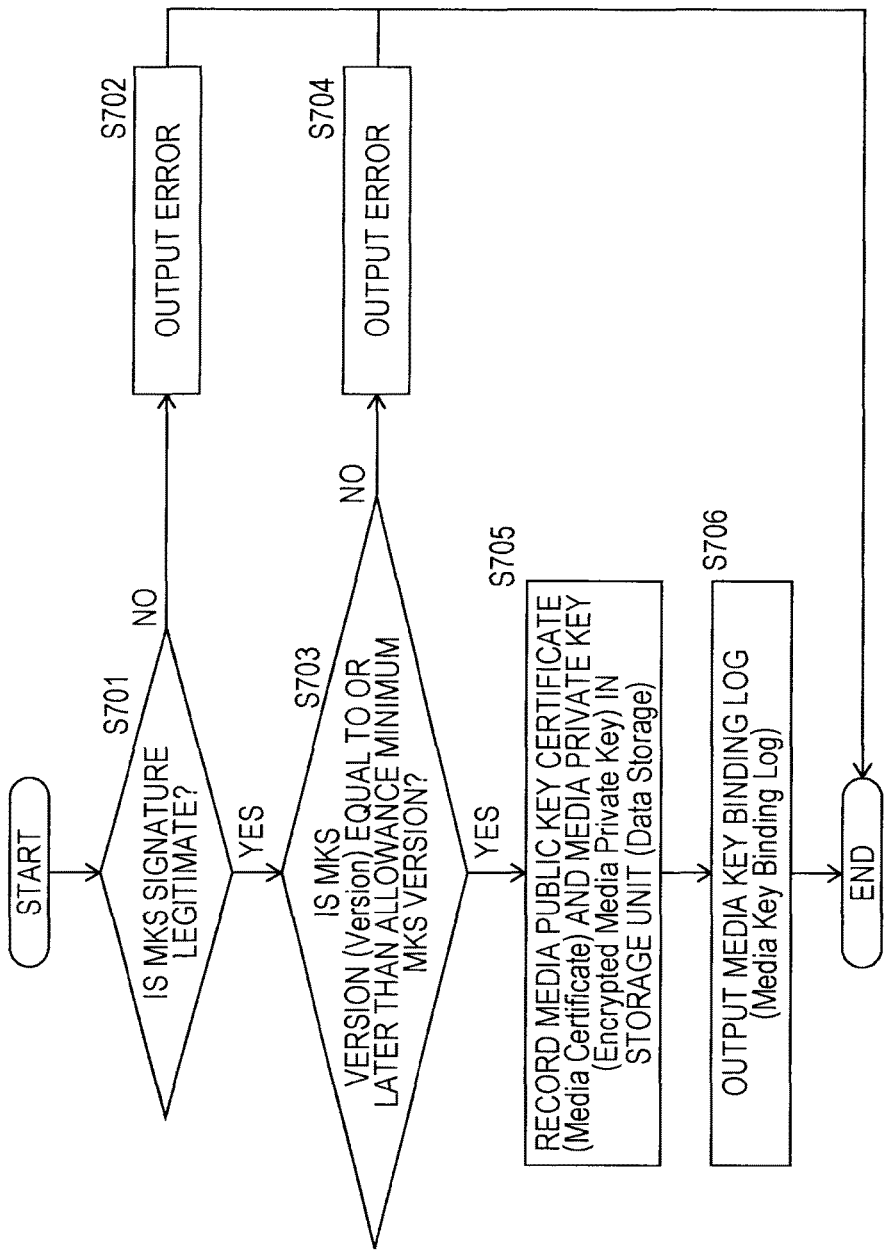
FIG. 18 is a diagram illustrating a flow chart for describing processing that is executed by the controller of an information storage device.

A processing sequence that is executed by the controller in the processing that records the MKS in the media is described referring to a flow chart illustrated in FIG. 18.

First, in Step S701, the controller executes the signature verification of the media key set (MKS) that is input.

As described referring to FIG. 15, a signature that is set with the private key of the license management apparatus (LA) is assigned to the media key set (MKS). The signature verification of such a digital signature is executed. The signature verification is executed using a license management apparatus (LA) public key (Kpurt) that has been stored in the controller.

With the signature verification, the presence or absence of the falsification in the MKS is determined. When it is confirmed that the falsification is absent in the MKS the signature verification of which is established, proceeding to the next processing takes place.

If the signature verification is not established and it is not confirmed that the falsification is absent in the MKS, the processing is discontinued without proceeding to the next processing. That is, proceeding to Step S702 takes place, and for example, the outputting of the error message and other operations are performed and the processing is ended. In such a case, the MKS recording processing is not executed.

In Step S701, when it is confirmed that the falsification is absent in the MKS the signature verification of which is established, proceeding to Step S703 takes place.

In Step S703, the controller reads an MKS version, that is, recording data in the media key set (MKS), and performs a comparison between the MKS version and a controller allowance minimum MKS version (Min MK Version) that has been recorded as the data within the controller.

With the version comparison, the writing allowance determining of the media key set (MKS) is executed.

In Step S703, if it is determined that the allowance minimum version≤the MKS version, proceeding to Step S705 takes place and proceeding to the recording processing of the MKS takes place.

On the other hand, in Step S703, if it is determined that the allowance minimum version>the MKS version, proceeding to Step S704 takes place and for example, the outputting of the error message and other operations are performed and then the processing is ended. In such a case, the processing is discontinued without executing the recording processing of the MKS.

In Step S703, if it is determined that the allowance minimum version≤the MKS version, proceeding to Step S705 takes place. In Step S705, the controller writes a media public key certificate (MCert) that is obtained by the MKS and an encrypted media private key (EKprm) in the storage unit of the media.

In addition, in Step S706, according to the writing processing of the MKS, the controller executes the generating processing and the outputting processing of the media key binding log (MKBL).

Specifically, the MKS ID is read from the media key public key certificate (MCert) and is connected to the controller identifier (IDc), and thus the MAC generating processing to which the controller key (Kc) is applied is executed.

With such processing, the media key binding log (MKBL) in which the pieces of data, such as (a) the media key set identifier (MKS ID), (b) the controller identifier (IDc), and (c) the message authentication code (MAC) generated by applying the controller key (Kc) are recorded is generated and is output to the license management apparatus (LA) through the key writing apparatus.

Moreover, the processing by the controller, which is described referring to FIG. 18, is executed according to the program that is recorded in advance within the controller. Such a program is recorded within the controller at the time of the manufacturing of the controller in the controller manufacturing apparatus.

In this manner, according to the present embodiment, at the time of the recording of the media key set (MKS) in the media (memory card), the comparison is executed between the MKS version that is recorded within the MKS and the allowance minimum MKS version that is recorded within the controller, and thus according to the result of the comparison, the allowance determining of the recording of the MKS is executed.

With such processing, it is possible, for example, to prevent illegitimate recording processing of the MKS that indefinitely records copy data in an old MKS into a new memory card.

8. Hardware Configuration Example of Each Apparatus

Lastly, a hardware configuration example of each apparatus that executes the processing described above is described referring to FIGS. 19 and 20.

Figure 19:
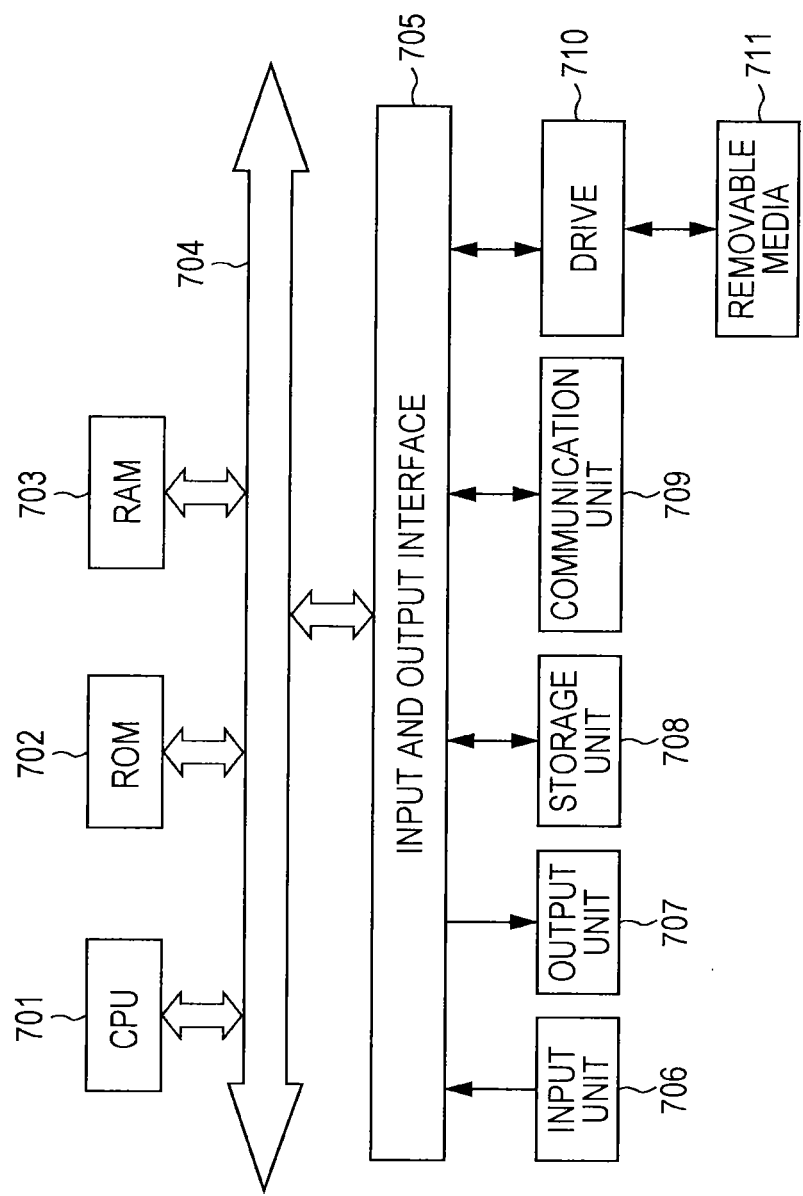
FIG. 19 is a diagram for describing a hardware configuration example of the information processing apparatus.

FIG. 19 illustrates a hardware configuration example of the information processing apparatus that executes the recording of the content in the media or the reproducing of the content from the media, the content provision apparatus such as the content provision server and the like, and the information processing apparatus that is applicable to the license management apparatus.

A central processing unit (CPU) 701 functions as the data processing unit that executes various processing according to a program that is stored in a read only memory (ROM) 702 or a storage unit 708. For example, the processing is executed according to the sequence described above. The program that is executed by the CPU 701, data, or the like is stored in a random access memory (RAM) 703. The CPU 701, the ROM 702, and the RAM 703 are connected to one another with a bus 704.

The CPU 701 is connected to an input and output interface 705 through the bus 704, and an input unit 706 that is configured from various switches, a keyboard, a mouse, a microphone, or the like, and an output unit 707 that is configured from a display, a speaker, or the like are connected to the input and output interface 705. The CPU 701 executes various processing in response to an instruction that is input from the input unit 706, and outputs a result of the processing, for example, to the output unit 707.

The storage unit 708, which is connected to the input and output interface 705, is configured, for example, from a hard disk and the like, and stores programs that are executed by the CPU 701 or various pieces of data. A communication unit 709 communicates with an external apparatus over a network, such as the Internet or a local area network.

A drive 710, which is connected to the input and output interface 705, drives a removable media 711, such as a magnetic disk, an optical disc, a magneto-optical disk, or a semiconductor memory such as a memory card, and obtains various pieces of data, such as content or key information that is recorded. For example, using content or key data that is obtained, decrypting of the content, reproducing processing, or the like is performed according to a reproduction program that is executed by the CPU.

FIG. 20 illustrates a hardware configuration example of the memory card that is the information storage device.

A central processing unit (CPU) 801 functions as the data processing unit that executes various processing according to a program that is stored in a read only memory (ROM) 802 or a storage unit 807. For example, according to each embodiment, processing that communicates with each of the apparatuses described above, processing that, for example, writes and reads to and from a storage unit 807, processing that determines whether or not access to divisional area units of a protected area 811 of the storage unit 807 is allowable, and the like are executed. The program that is executed by the CPU 801, data, or the like is properly stored in a random access memory (RAM) 803. The CPU 801, the ROM 802, and the RAM 803 are connected to one another with a bus 804.

The CPU 801 is connected to an input and output interface 805 through the bus 804, and a communication unit 806 and a storage unit 807 are connected to the input and output interface 805.

A communication unit 804 that is connected to the input and output interface 805, for example, performs communication with a server or a host. The storage unit 807 has a protected area 811 that is a data storage area and is limited in access as described above, and a general purpose area 812 on which data recording and reading can be freely performed.

9. Configuration and Conclusions of the Present Disclosure

The embodiments according to the present disclosure are described in detail referring to the specific embodiments. However, it is apparent that a person of ordinary skill in the art can accomplish modifications to or substitutes for the embodiments in a range that does not deviate from the gist of the present disclosure. That is, because the present invention is disclosed in the form of embodiments, the present invention should not be interpreted in a limited manner. In order to determine the gist of the present disclosure, the scope of the claim should be considered.

Moreover, the technology disclosed in the present specification can be configured as follows.

(1) An information storage device including: a storage unit in which key information is stored; and a controller that executes processing which records the key information in the storage unit, in which the controller compares a key version that is set to correspond to the key information and an allowance minimum key version which is recorded, in advance, within the controller, and records the key information in the storage unit under the condition that it is confirmed that the key version is equal to or greater in value than the allowance minimum key version.

(2) The information storage device according to (1), in which the key information is key information that is generated by a license management apparatus, in which the key version is version information that is set depending on the date and time of generation of the key information by the license management apparatus, and in which the allowance minimum key version is version information that is stored in the controller depending on the date and time of manufacture of the controller by an apparatus that manufactures the controller.

(3) The information storage device according to (1) or (2), in which the key information includes a media public key and a media private key that are inherent to the information storage device.

(4) The information storage device according to any one of (1) to (3), in which the key information is a media key set (MKS) that includes a media public key and a media private key that are inherent to the information storage device, which is generated by a license management apparatus and an MKS version that is the key version that is set by the license management apparatus, in which the allowance minimum key version is an allowance minimum MKS version that is set by a controller manufacturing apparatus, and in which the controller executes processing that compares the MKS version that is recorded in the media key set (MKS) by inputting the media key set (MKS), and the allowance minimum MKS version, and records the media public key and the media private key in the storage unit under the condition that it is confirmed that the MKS version is equal to or greater in value than the allowance minimum MKS version.

(5) The information storage device according to (4), in which the media key set (MKS) is data that is generated by the license management apparatus and that the license management apparatus sets a digital signature to be in, and in which the controller performs signature verification processing on the digital signature, executes verification of the presence of absence of falsification of the media key set (MKS), confirm with establishment of signature verification that there is no falsification of the media key set (MKS), and then executes the processing that compares the MKS version and the allowance minimum MKS version.

(6) The information storage device according to any one of (1) to (5), in which after processing that records the key information in the storage unit, the controller executes processing that generates and thus outputs a key binding log that includes an identifier of the key information and an identifier of the controller.

(7) The information storage device according to (6), in which the controller generates the key binding log in which a falsification verification value is assigned to data including the identifier of the key information and the identifier of the controller.

(8) An information processing system including: an information storage device (media) that has a storage unit and a controller; a license management apparatus that generates a media key set (MKS) which is an inherent key set that is stored in the information storage device; a controller manufacturing apparatus that manufactures the controller that is stored in the information storage device; and a media manufacturing apparatus that manufactures the information storage device, in which the license management apparatus sets an MKS version that depends on the date and time of the generation of the media key set (MKS), to be in the media key set (MKS), and provides the media key set (MKS) to the media manufacturing apparatus, in which the controller manufacturing apparatus stores an allowance minimum MKS version that depends on the date and time of the manufacture of the controller, in the controller and provides the controller to the media manufacturing apparatus; and in which at the time of manufacturing of the information device (media), the media manufacturing apparatus inserts the controller into the media, and executes processing that inputs the media key set (MKS) into the controller inside of the media, and under the condition that it is confirmed that the controller inside of the media executes processing that compares the MKS version that is recorded in the media key set (MKS) and the allowance minimum MKS version and the condition that it is confirmed that the MKS version is equal to or greater in value than the allowance minimum MKS version, the media manufacturing apparatus executes processing that records in the storage unit a media public key and a media private key that are included in the media key set (MKS).

(9) The information processing system according to (8), in which after processing that records the media public key and the media private key in the storage unit, the controller generates and thus outputs a key binding log that includes an identifier of the MKS and an identifier of the controller, and in which the license management apparatus inputs the key binding log and thus retains the key binding log as management data.

In addition, a method of processing that is executed on the device and the system that are described above, and a program that executes the processing also are included in a configuration of the present disclosure.

Furthermore, it is possible to execute a processing sequence described throughout the specification, in hardware or software, or with a configuration that results from combining both. If the processing is executed in software, it is possible to install the program in which the processing sequence is recorded, in a memory inside of a computer that is incorporated into dedicated hardware and thus execute the program, or to install the program on a general-purpose computer on which various processing is executable and thus execute the program. For example, the program can be recorded, in advance, in a recording medium. In addition to being installed on the computer from the recording medium, the program can be received over a network, such as a local area network (LAN) and the Internet, and be installed in a recording medium such as a built-in hard disk.

Moreover, various processing described in the specification may be not only executed in time series as described, but may be also executed in parallel or individually according to the processing ability of an apparatus to execute the processing or whenever necessary. Furthermore, a system in the present specification is configured to be a logical combination of multiple apparatuses, and the apparatuses in each configuration are not limited to being within the same housing.

INDUSTRIAL APPLICABILITY

As described above, with a configuration of one embodiment in the present disclosure, a device and a method for preventing using of illegitimate content or manufacturing of the illegitimate media that uses illegitimate media are provided.

Specifically, in a system that has an information storage device, a license management apparatus that generates a media key set (MKS) that is stored in the information storage device, and a content provision apparatus, at the time of manufacturing of the information storage device, the license management apparatus compares an MKS version that is set in the MKS that is stored in the information storage device, and an allowance minimum MKS version that is recorded in a controller of the information storage device, and thus records key information stored in the MKS, in a storage unit under the condition that it is confirmed that the MKS version is equal to or greater in value than the allowance minimum MKS version.

With these configurations, a configuration is realized that prevents using of illegitimate content or manufacturing of the illegitimate media that uses illegitimate media.

REFERENCE SIGNS LIST

11 BROADCASTING STATION
12 CONTENT SERVER
20 INFORMATION PROCESSING APPARATUS
21 APPARATUS DEDICATED TO RECORDING AND REPRODUCING
22 PC
23 PORTABLE TERMINAL
30 INFORMATION STORAGE DEVICE
31 MEMORY CARD
110 CONTROLLER (DATA PROCESSING UNIT)
111 CPU
112 RAM
120 STORAGE UNIT
121 USER DATA AREA
122 SECURE AREA
131 PRIVATE AREA
132 REVOCATION INFORMATION
133 MEDIA PRIVATE KEY
134 MEDIA PUBLIC KEY CERTIFICATE
135 LICENSE MANAGEMENT APPARATUS PUBLIC KEY
140 COMMUNICATION IF
210 LICENSE MANAGEMENT APPARATUS
220 MEDIA KEY SET (MKS)
221 PUBLIC KEY CERTIFICATE
222 PRIVATE KEY
230 CONTROLLER KEY (Kc)
240 CONTROLLER MANUFACTURING APPARATUS
250 CONTROLLER
251 CONTROLLER KEY (Kc)
252 CONTROLLER ID (IDc)
260 MEDIA MANUFACTURING APPARATUS
261 KEY WRITING APPARATUS
270 MEMORY CARD
280 CONTROLLER
281 CONTROLLER KEY (Kc)
282 CONTROLLER ID (IDc)
290 STORAGE UNIT
291 MEDIA KEY SET (MKS)
510 LICENSE MANAGEMENT APPARATUS (LA)
511 MKS IDENTIFIER (MKS ID)
512 MEDIA PUBLIC KEY (Kpum)
513 LICENSE MANAGEMENT APPARATUS PRIVATE KEY (Kprrt)
514 MEDIA PUBLIC KEY CERTIFICATE (MCert)
515 MEDIA PRIVATE KEY (Kprm)
516 CONTROLLER KEY (Kc)
517 ENCRYPTED MEDIA PRIVATE KEY (EKprm)
518 MKS VERSION
520 CONTROLLER MANUFACTURING APPARATUS
521 CONTROLLER
523 CONTROLLER ID (IDc)
524 LICENSE MANAGEMENT APPARATUS (LA) PUBLIC KEY (Kpurt)
525 ALLOWANCE MINIMUM MKS VERSION
530 MEDIA MANUFACTURING APPARATUS
540 MEMORY CARD
541 STORAGE UNIT
550 KEY WRITING APPARATUS
551 MEDIA KEY BINDING LOG
701 CPU
702 ROM
703 RAM
704 BUS
705 INPUT AND OUTPUT INTERFACE
706 INPUT UNIT
707 OUTPUT UNIT
708 STORAGE UNIT
709 COMMUNICATION UNIT
710 DRIVE
711 REMOVABLE MEDIA
801 CPU
802 ROM
803 RAM
804 BUS
805 INPUT AND OUTPUT INTERFACE 806 COMMUNICATION UNIT
807 STORAGE UNIT
811 PROTECTED AREA
812 GENERAL-PURPOSE AREA

The invention claimed is:

1. An information storage device, comprising:
an interface configured to receive a media key set (MKS) from a license management apparatus,
wherein the MKS is inherent to the information storage device;
a storage unit; and
a controller configured to:
   determine a MKS version and key information based on the received MKS;
   record the key information in the storage unit based on the MKS version that is equal to or greater in value than an allowance minimum key version,
      wherein the allowance minimum key version is recorded in advance in the controller:
   generate a media key binding log based on the key information; and
   output the generated media key binding log to the license management apparatus.

2. The information storage device according to claim 1, wherein the allowance minimum key version is based on a date and a time of manufacture of the controller.

3. The information storage device according to claim 1, wherein the key information includes a media public key and a media private key that are inherent to the information storage device.

4. The information storage device according to claim 1,
wherein the key information includes a media public key and a media private key that are inherent to the information storage device,
wherein the allowance minimum key version is based on a date of manufacture of the controller, and
wherein the controller is further configured to
   record the media public key and the media private key in the storage unit based on the MKS version that is equal to or greater in value than the allowance minimum key version.

5. The information storage device according to claim 4, wherein the controller is further configured to:
   determine a digital signature of the license management apparatus from the received MKS;
   verify the digital signature; and
   determine absence of falsification of the received MKS based on the verification of the digital signature.

6. The information storage device according to claim 1, wherein the media key binding log includes a first identifier of the key information and a second identifier of the controller.

7. The information storage device according to claim 6, wherein the controller is further configured to generate the media key binding log in which a falsification verification value is assigned to data that includes the first identifier of the key information and the second identifier of the controller.

8. An information processing system, comprising:
an information storage device that has a storage unit and a controller;
a license management apparatus, comprising:
   a first central processing unit (CPU); and
   a first memory coupled to the first CPU, wherein the first memory comprises first instructions for causing the first CPU to generate a media key set (MKS) which is an inherent key set stored in the information storage device;
a controller manufacturing apparatus, comprising:
   a second central processing unit (CPU); and
   a second memory coupled to the second CPU, wherein the second memory comprises second instructions for causing the second CPU to manufacture the controller stored in the information storage device; and
a media manufacturing apparatus comprising:
   a third central processing unit (CPU); and
   a third memory coupled to the third CPU, wherein the third memory comprises third instructions for causing the third CPU to manufacture the information storage device,
wherein the license management apparatus is configured to:
   set an MKS version that depends on a date and a time of the generation of the MKS, to be in the MKS; and
   provide the MKS to the media manufacturing apparatus,
wherein the controller manufacturing apparatus is configured to:
   store an allowance minimum MKS version, that depends on a date and a time of the manufacture of the controller, in the controller; and
   provide the controller to the media manufacturing apparatus, and
wherein the media manufacturing apparatus is configured to:
   insert the controller into the media;
   input the MKS into the controller;
   compare the MKS version recorded in the MKS and the allowance minimum MKS version; and
   based on the MKS version that is equal to or greater in value than the allowance minimum MKS version, record in the storage unit, a media public key and a media private key that are included in the MKS.

9. The information processing system according to claim 8,
wherein the controller is further configured to generate and output a key binding log that includes an identifier of the MKS and an identifier of the controller, and
wherein the license management apparatus is further configured to input the key binding log and retain the key binding log as management data.

10. An information processing method, comprising:
in an information storage device:
   receiving, by an interface of the information storage device, a media key set (MKS) from a license management apparatus,
      wherein the MKS is inherent to the information storage device;
   determining, by a controller of the information storage device, a MKS version and key information based on the received MKS;
   recording, by the controller of the information storage device, the key information in a storage unit of the information storage device based on the MKS version that is equal to or greater in value than an allowance minimum key version,
      wherein the allowance minimum key version is recorded in advance in the controller;
   generating, by the controller of the information storage device, a media key binding log based on the key information; and outputting, by the controller of the information storage device, the generated media key binding log to the license management apparatus.

11. A non-transitory computer-readable storage medium having stored thereon, computer-executable instructions for causing a controller of an information storage device to execute operations, the operations comprising:

controlling an interface of the information storage device to receive a media key set (MKS) from a license management apparatus, wherein the MKS is inherent to the information storage device;

determining a MKS version and key information based on the received MKS recording the key information in a storage unit of the information storage device based on the MKS version that is equal to or greater in value than an allowance minimum key version, wherein the allowance minimum key version is recorded in advance in the controller;

generating a media key binding log based on the key information; and outputting the generated media key binding log to the license management apparatus.

12. An information storage device, comprising:
an interface configured to receive a media key set (MKS) from a license management apparatus,
wherein the MKS is inherent to the information storage device;
a storage unit; and
a controller configured to:
  determine a MKS version, a media public key, and a media private key based on the received MKS,
  wherein the media public key and the media private key are inherent to the information storage device;
  record the media public key and the media private key in the storage unit based on the MKS version that is equal to or greater in value than an allowance minimum key version,
  wherein the allowance minimum key version is recorded in advance in the controller and is based on a date of manufacture of the controller;
  generate a media key binding log based on the media public key and the media private key; and
  output the generated media key binding log to the license management apparatus.

13. The information storage device according to claim 1, wherein the media key binding log includes an identifier of the media key set (MKS-ID), a controller identifier, and a message authentication code (MAC).

* * * * *